(12) United States Patent
de los Reyes et al.

(10) Patent No.: US 7,730,425 B2
(45) Date of Patent: Jun. 1, 2010

(54) FUNCTION-ORIENTED USER INTERFACE

(76) Inventors: Isabelo de los Reyes, 14636 NE. 45th St., Apt. C17, Bellevue, WA (US) 98007; Nathanael Roberton, 807 NE. 200th St., Shoreline, WA (US) 98155; Brian Calvery, 17408 NE. 14th St., Bellevue, WA (US) 98008-3105; Timothy J. E. Turner, 5703 W. Dr., Everett, WA (US) 98203-3504; Adrian Chandley, 20529 NE. 34th Pl., Sammamish, WA (US) 98074-4333; Daniel Makoski, 19819 NE. 106th Pl., Redmond, WA (US) 98053; Paul Henderson, 13850 NE. 1st Pl., Bellevue, WA (US) 98005; Egor Nikitin, 16921 NE. 38th Pl., Bellevue, WA (US) 98008; Tarek Elabbady, 12919 169th Ave. NE., Redmond, WA (US) 98052; Phillip Joe, 1235 17th Ave. E., Seattle, WA (US) 98112

( * ) Notice: Subject to any disclaimer, the term of this patent is extended or adjusted under 35 U.S.C. 154(b) by 263 days.

(21) Appl. No.: 11/292,377

(22) Filed: Nov. 30, 2005

(65) Prior Publication Data
US 2007/0124677 A1   May 31, 2007

(51) Int. Cl.
*G06F 3/048* (2006.01)
(52) U.S. Cl. .................. 715/835; 715/834; 715/839
(58) Field of Classification Search ............. 715/835
See application file for complete search history.

(56) References Cited

U.S. PATENT DOCUMENTS

| | | | | |
|---|---|---|---|---|
| 5,299,307 | A * | 3/1994 | Young | 715/861 |
| 5,943,039 | A * | 8/1999 | Anderson et al. | 715/810 |
| 6,448,987 | B1 * | 9/2002 | Easty et al. | 715/834 |
| 6,544,123 | B1 * | 4/2003 | Tanaka et al. | 463/36 |
| 7,096,431 | B2 * | 8/2006 | Tambata et al. | 715/834 |
| 2001/0043198 | A1 * | 11/2001 | Ludtke | 345/173 |
| 2002/0084983 | A1 * | 7/2002 | Boldy | 345/157 |
| 2003/0043206 | A1 * | 3/2003 | Duarte | 345/810 |
| 2004/0100479 | A1 * | 5/2004 | Nakano et al. | 345/700 |
| 2006/0020900 | A1 * | 1/2006 | Kumagai et al. | 715/767 |
| 2006/0095865 | A1 * | 5/2006 | Rostom | 715/810 |
| 2006/0112354 | A1 * | 5/2006 | Park et al. | 715/835 |
| 2006/0248475 | A1 * | 11/2006 | Abrahamsson | 715/835 |

* cited by examiner

*Primary Examiner*—Dennis-Doon Chow
*Assistant Examiner*—Anil N Kumar
(74) *Attorney, Agent, or Firm*—Marshall, Gerstein & Borun LLP

(57) ABSTRACT

A function-oriented user interface presents users with selections related to what they want to do, rather than selections related to what tool they want to use. Functions may be dragged onto elements (data objects) or elements may be dragged onto functions to initiate activity. The elements themselves may present icons representing functions that are available such as adding a voice note or addressing to another person.

5 Claims, 43 Drawing Sheets

FUNCTION-ORIENTED USER INTERFACE

BACKGROUND

Traditional graphical user interfaces presented by operating systems are oriented toward tools. For instance, some user interfaces present graphical representations or icons of various tools from which a user can select. Icons may have product name or supplier brand identifiers that are not description of the function performed. Even when a name is suggestive of function, such as "Microsoft Word™," the name or its icon may be lost in a sea of icons or long lists of installed applications or other products. However, most novice computer users, and many other computer users as well, have no idea what most, if not all, of those programs will do. This can often leave users confused and frustrated when making a selection of a program, often with no clear idea of the result. They may simply have no idea where to start to perform what should be a simple function. The tool-oriented nature of user interface stems from tool providers desire to promote their products, often with cleaver names and fancy icons, but often without a clear indication of what a program might actually do.

SUMMARY

A user interface is designed to allow users to select functions, rather than tools, enabling the user to have a clear view of what a particular selection is used for, rather than merely a list of tools by name. For example, three basic areas have been noted as functional 'pillars' on which most users rely. They are documents/workplace, entertainment, and the Internet/communication. By presenting users with these three pillars, and other easily recognized functions, the user does not have to guess what will happen when a selection is made. Most operating systems have default settings associating file types and functional programs. Therefore, when a functional selection is made, the user is given the program already selected as the default.

Even when in an application, such as in a home productivity application, a functional user interface may allow users to graphically select activities by what they-want to accomplish, rather than by tool. For example, when creating a note for adding to a calendar, a user may be allowed to select from a set of functional icons such as 'voice notes,' or 'calendar.' In a graphical setting, the ability to drag and drop both directions also gives greater flexibility and accommodates different user preferences. For example, a note or other document can be dragged onto a 'voice note' icon to add a voice note to the document. Conversely, the 'voice note' icon may be dragged onto the document with the same effect.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
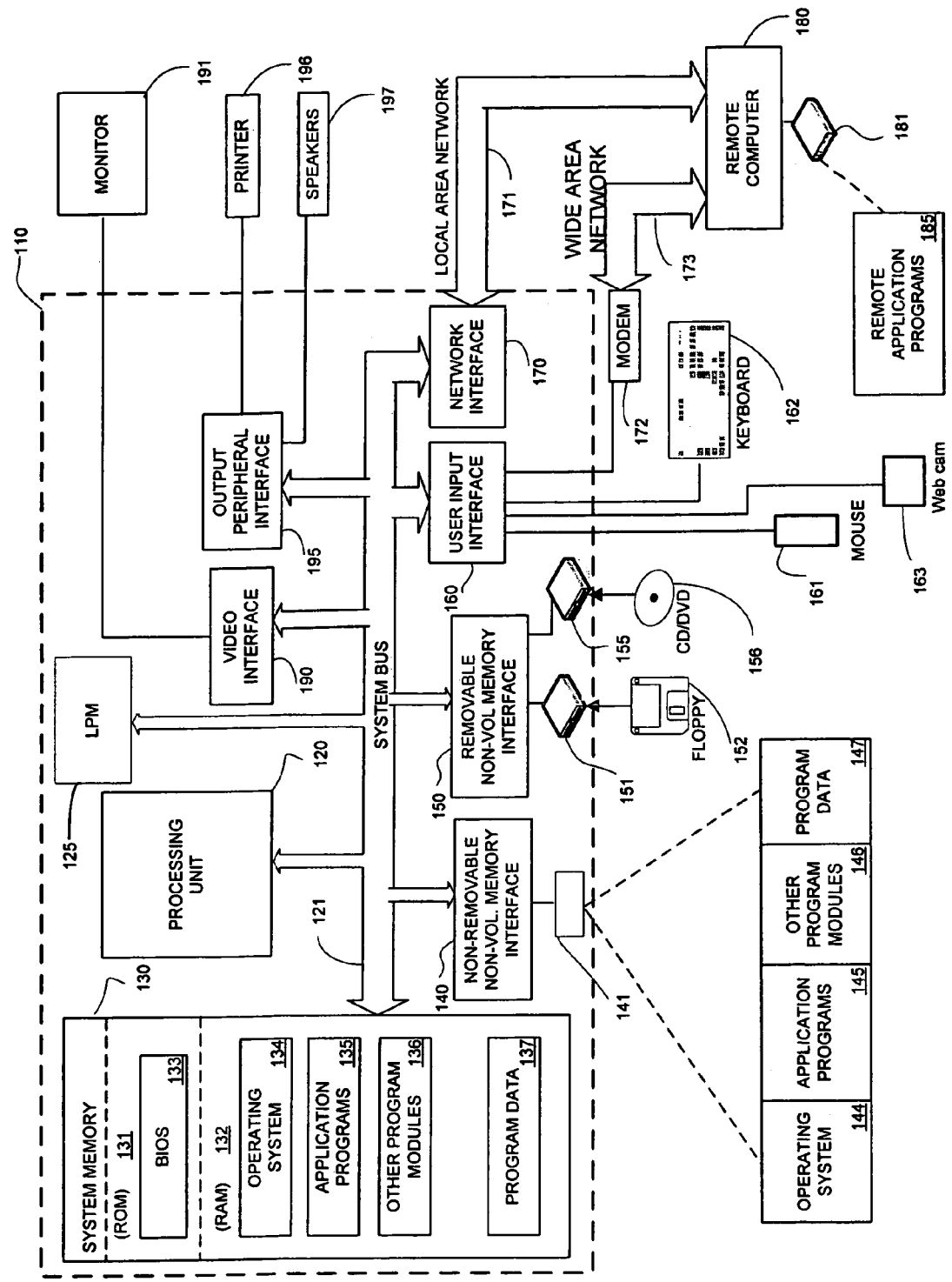
FIG. 1 is a block diagram of a computer that may support a function-oriented user interface.

FIG. 1 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a lower provisioning module (LPM) 125. The lower provisioning module 125 is a hardware component of a license provisioning service and has a corresponding software component, an upper provisioning module. The lower provisioning module 125 may be implemented in hardware as depicted, but may be instantiated in software given an appropriate execution environment in consideration of expected security risks.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2A:
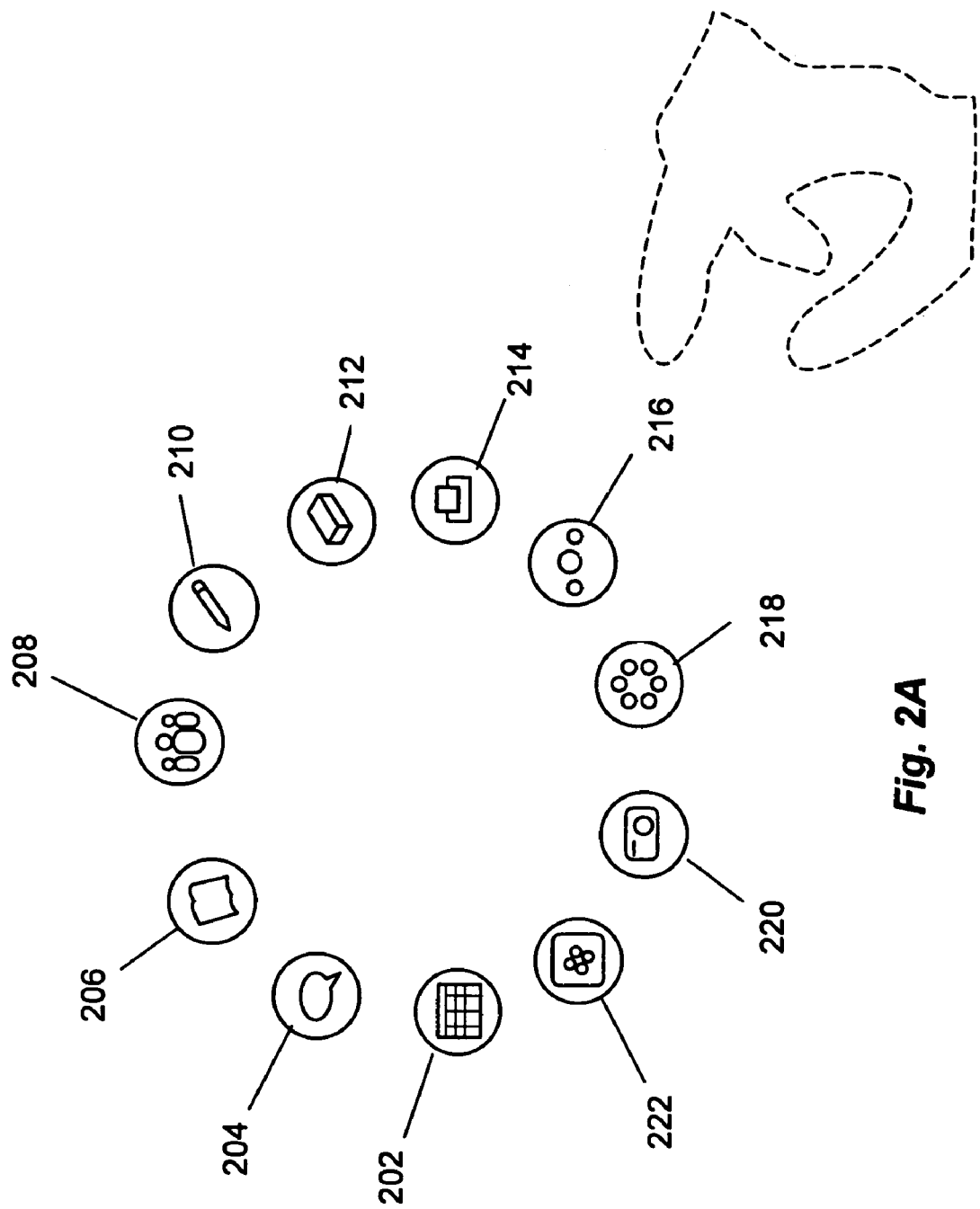
FIGS. 2A-2B depict the presentation of a function-oriented user interface.
Figure 2B:
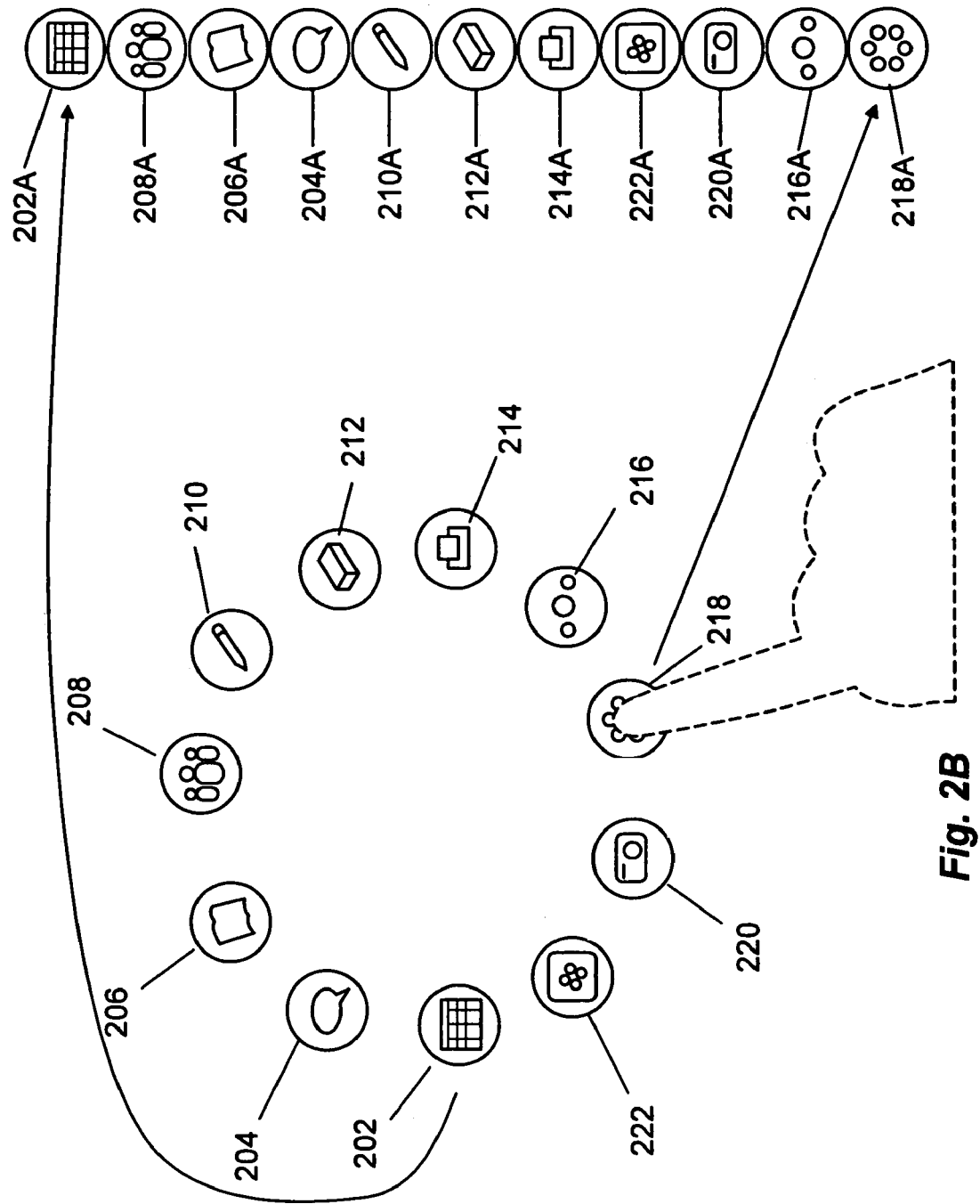

FIGS. 2A-2B depict the presentation of a function-oriented user interface. FIG. 2A shows a series of functional icons arranged in a circular pattern, also called an orb. the different elements of the orb are, a calendar icon 202, a voice note icon 204, a Notes icon 206, and address and communication icon 208, a draw icon 210, a delete icon 212, a print icon 214, and expand icon 216, a home icon 218, a picture icon 220, and a media icon 222. As illustrated below with various exemplary embodiments, activating any icon, with a cursor control or touchscreen, allows the user to perform a related function. The icons may also be moved and anchored to another spot in the screen for convenience. In one embodiment, the remaining icons follow the lead icon and can be referred to as a caterpillar. FIG. 2B shows the result of moving the icons. The icons are shown vertically aligned on the right edge of the display or screen. The moved, and in this case reordered, icons are from top to bottom, the calendar 202A, the address icon 208A, the note icon 206A, the voice note icon 204A, the drawing icon 210A, the delete icon 212A, the print icon 214A, the entertainment icon 222A, the picture of icon 220A, the expand icon 216A, and the home icon 218A. In an exemplary embodiment, there are one or more docking locations defined on the screen where caterpillar may be moved where the lead icon snaps to the location and the icons consistently align.

Figure 3A:
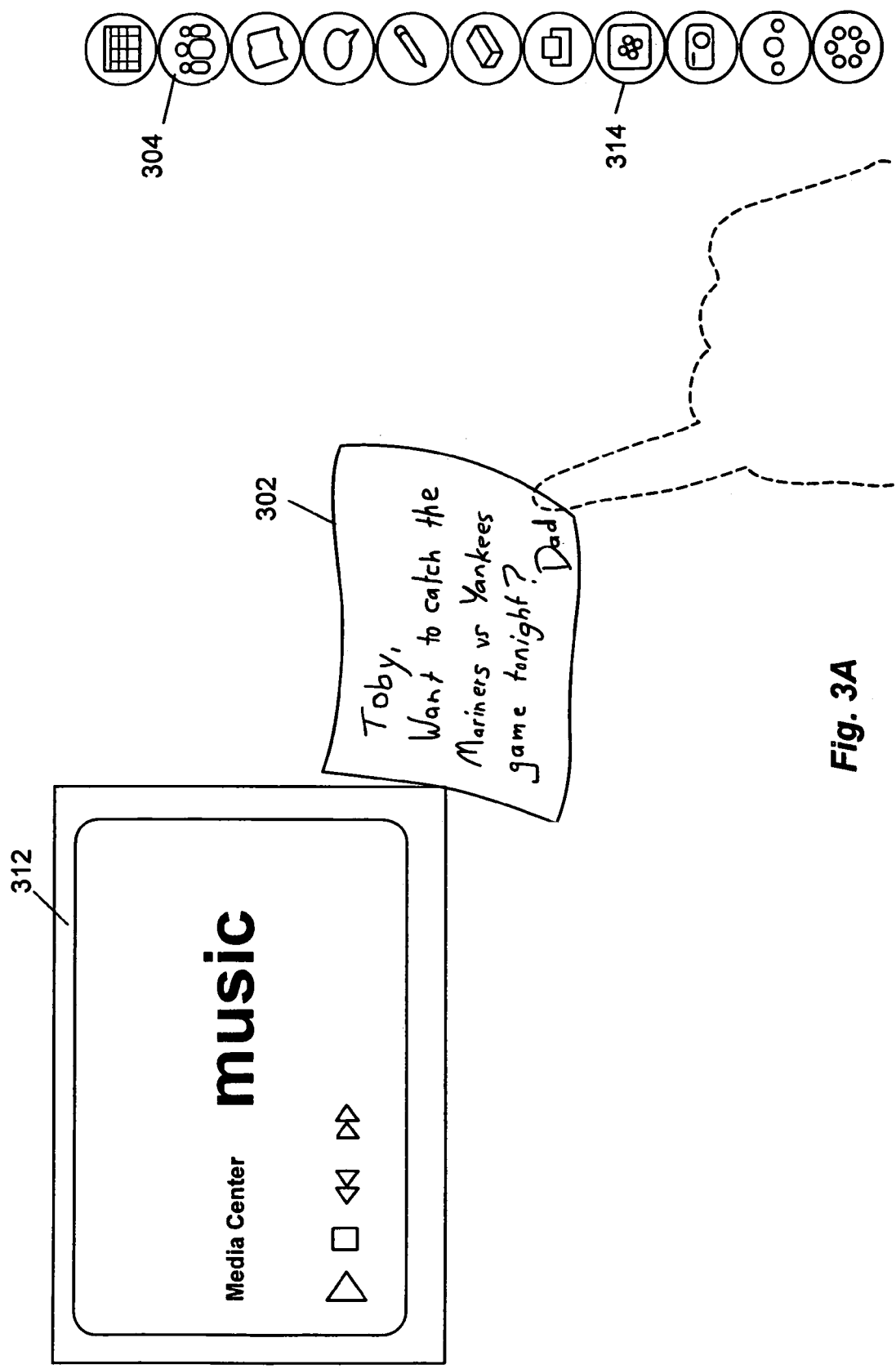
FIGS. 3A-3C depict action patterns supported by a functional user interface.
Figure 3B:
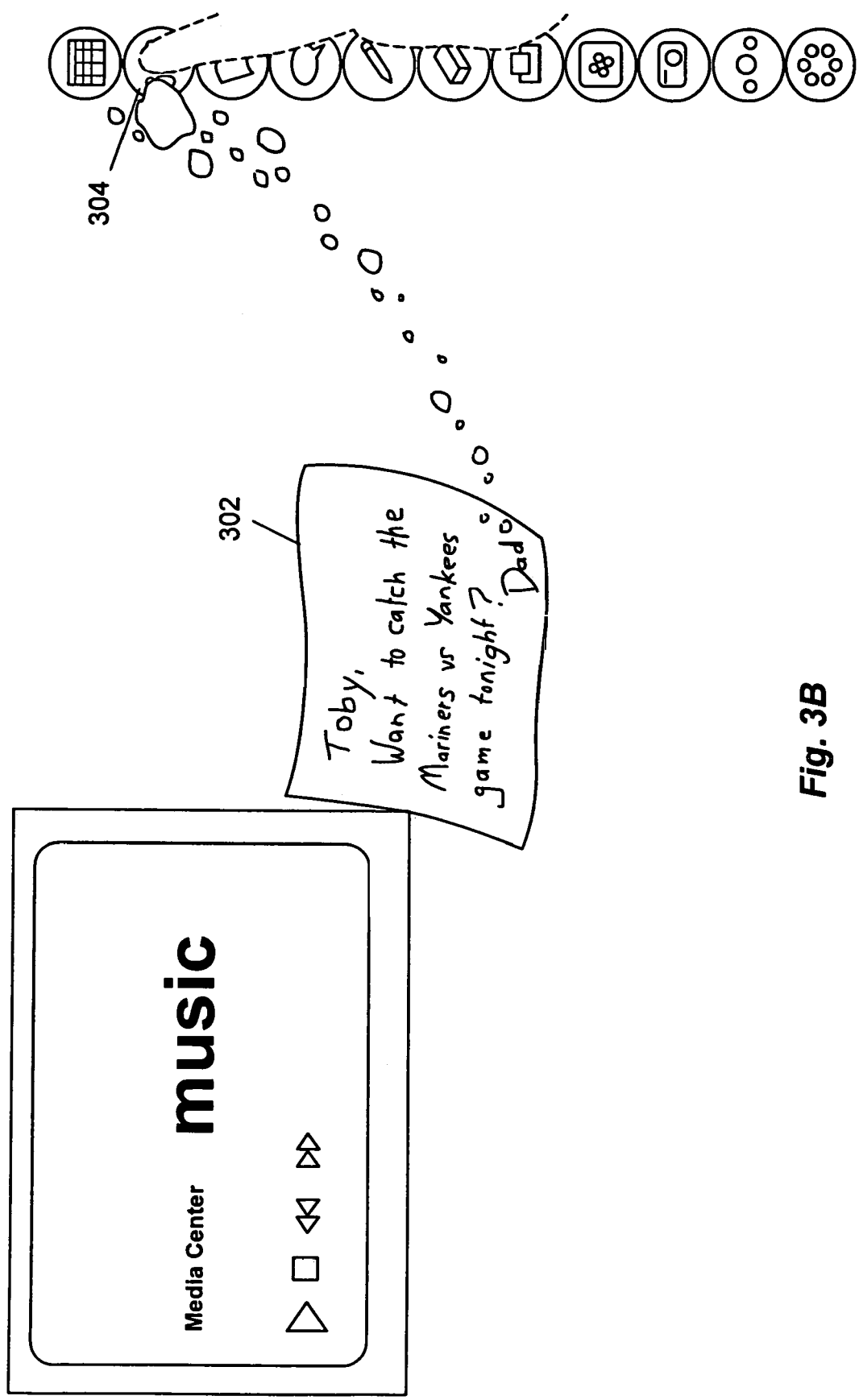
Figure 3C:
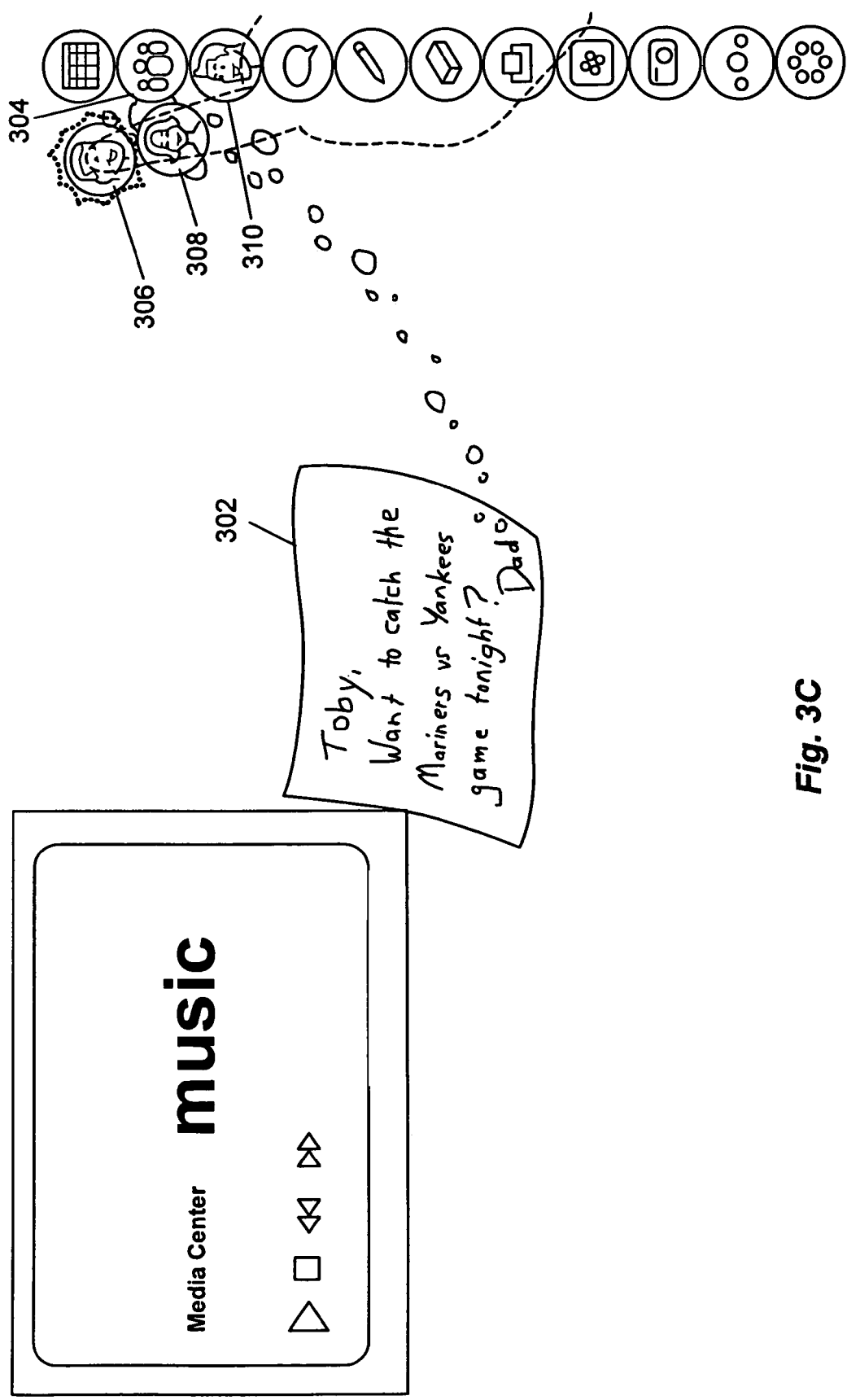

FIGS. 3A-3C depict action patterns supported by a functional user interface. FIG. 3A shows entertainment window 312 in the upper right, the result of activating the entertainment icon 314. FIG. 3A also shows a previously created note 302. By grabbing the note 302 at the lower right hand corner, and dragging it to address icon 304 as shown in FIG. 3B, a series of sub icons 306, 308, and 310 are displayed indicating recipients of the note 302, as shown in FIG. 3C. The icon 306 is shown being selected using the touchscreen.

Figure 4A:
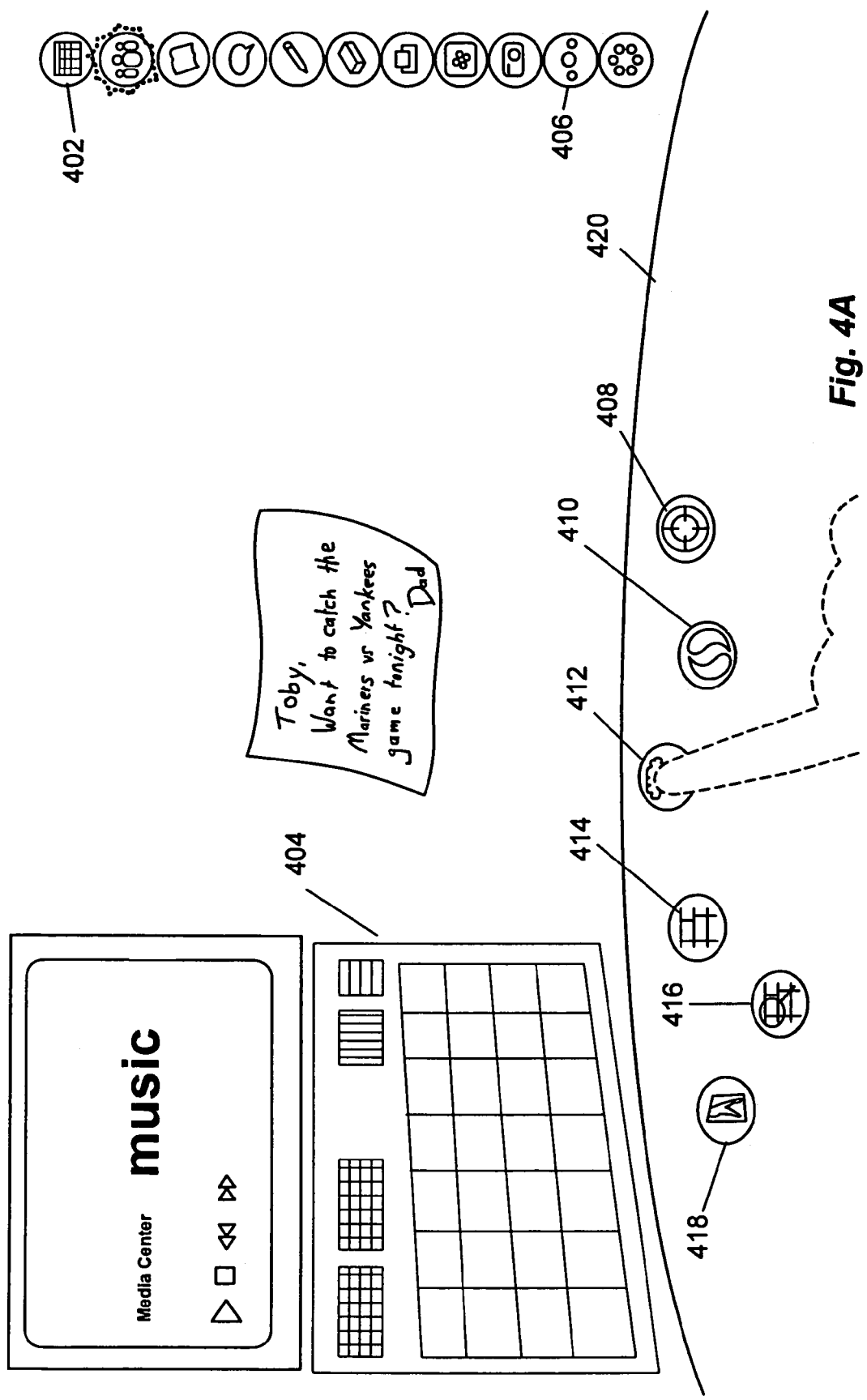
FIGS. 4A-4C depict action patterns supported by a functional user interface.
Figure 4B:
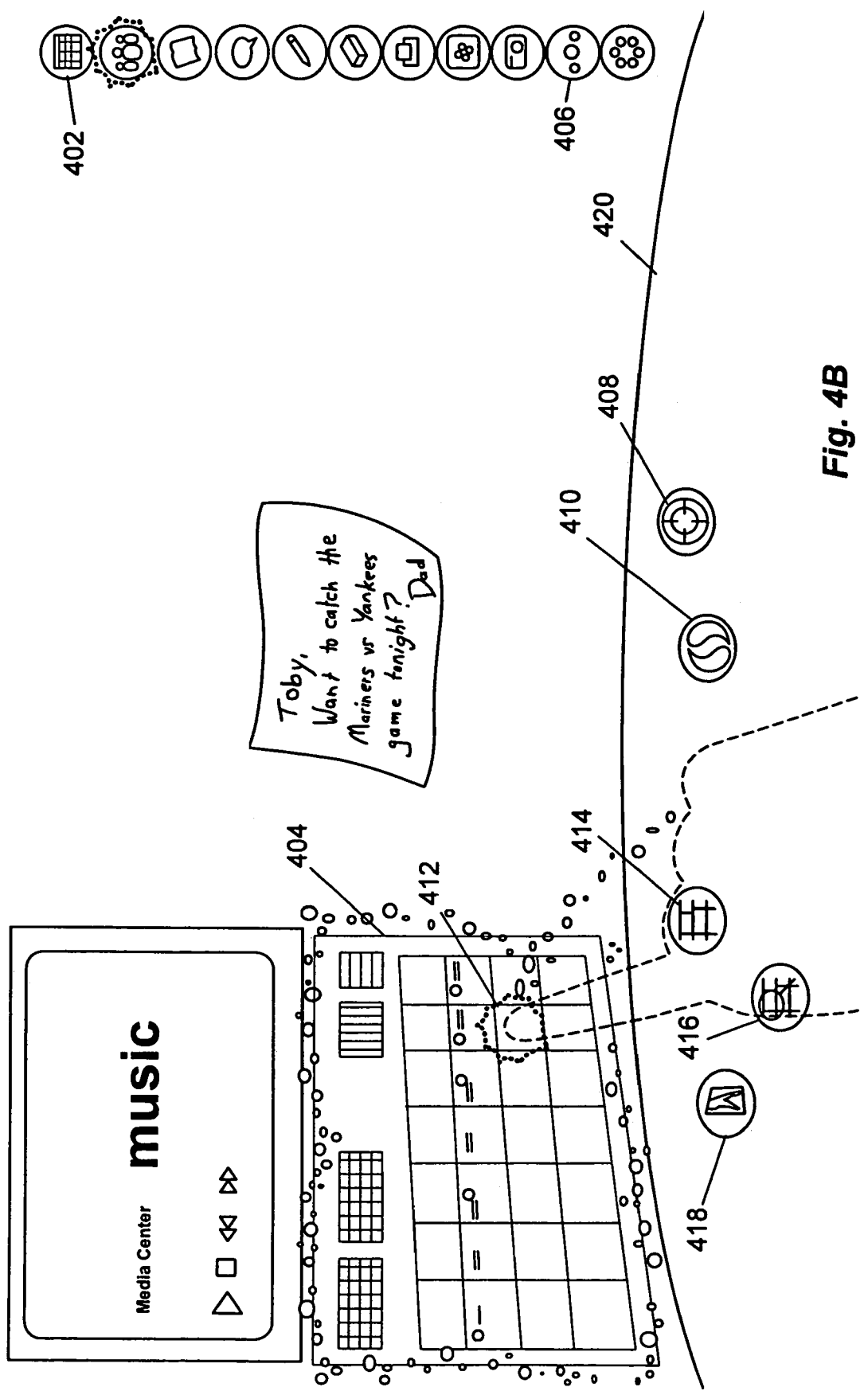
Figure 4C:
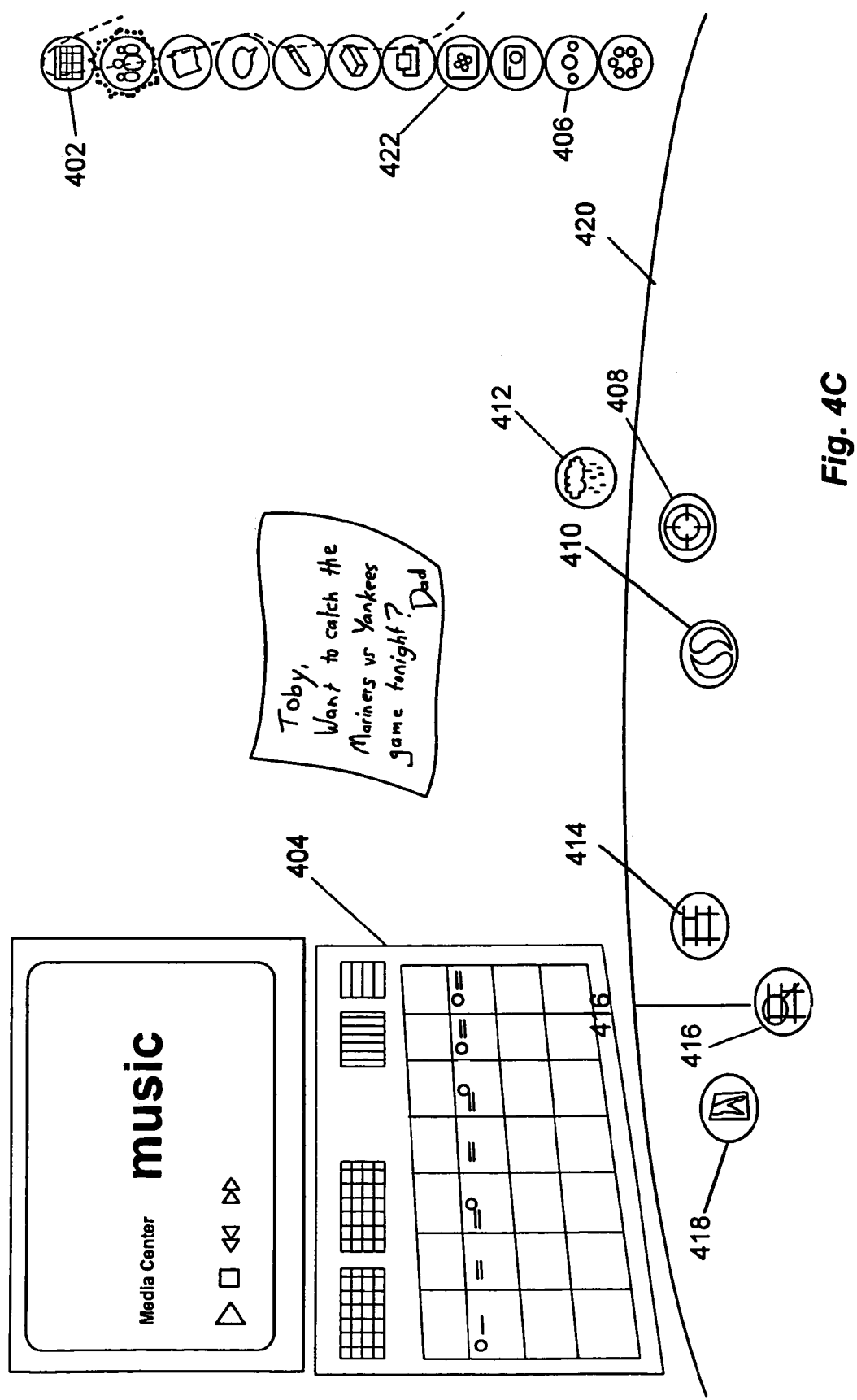

FIGS. 4A-4C depict action patterns supported by a functional user interface. FIG. 4A shows the calendar icon 402 in the upper right corner and shows the calendar 404 in the middle left of the display, that results from activation of the calendar icon 402. Activation of the expand icon 406 results in additional functions being displayed below the separator arc 420. Shown in this exemplary embodiment are an activity icon 408, a shopping icon 410, a weather icon 412, traffic icon 414, map and directions icon 416, and Yellow Pages icon 418. The weather icon 412 is shown being selected and in FIG. 4B is shown being dragged onto the calendar 404. In FIG. 4C, the result of the weather icon 412 being moved around the calendar 404 can be seen as the weather forecast for the next seven days being depicted on the respective days of the calendar 404. The weather icon 412 is shown above the separator line 420, indicating that the weather function is active. The drag-to-activate notion may be used for other metaphors. For example, a TV show displayed on a TV listing (not depicted) may be dragged onto the calendar 404 to set a reminder. Similarly, the TV listing may be dragged onto the entertainment icon 422 to schedule recording of the corresponding TV broadcast.

Figure 5A:
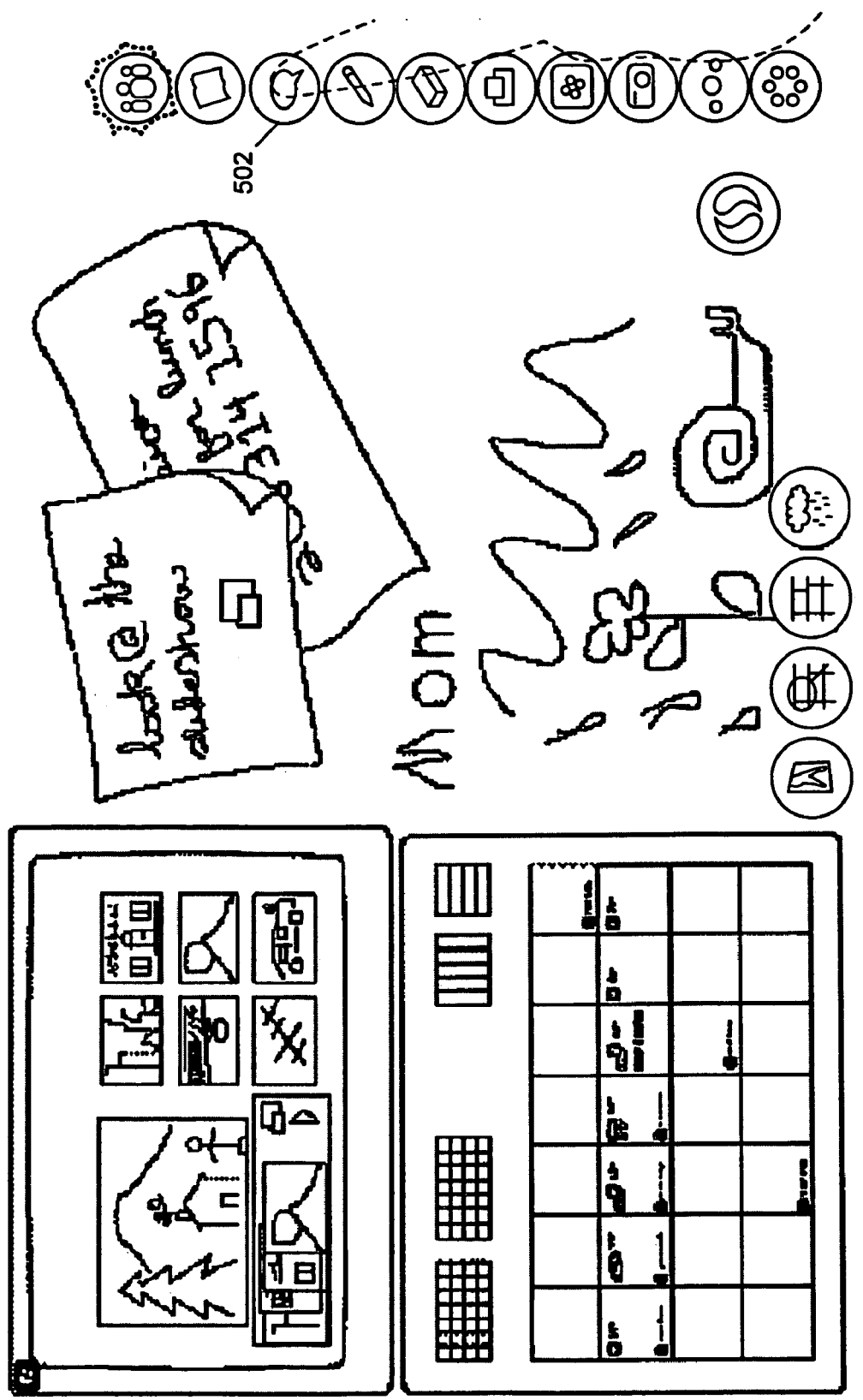
FIGS. 5A-5I depict action patterns supported by a functional user interface.
Figure 5B:
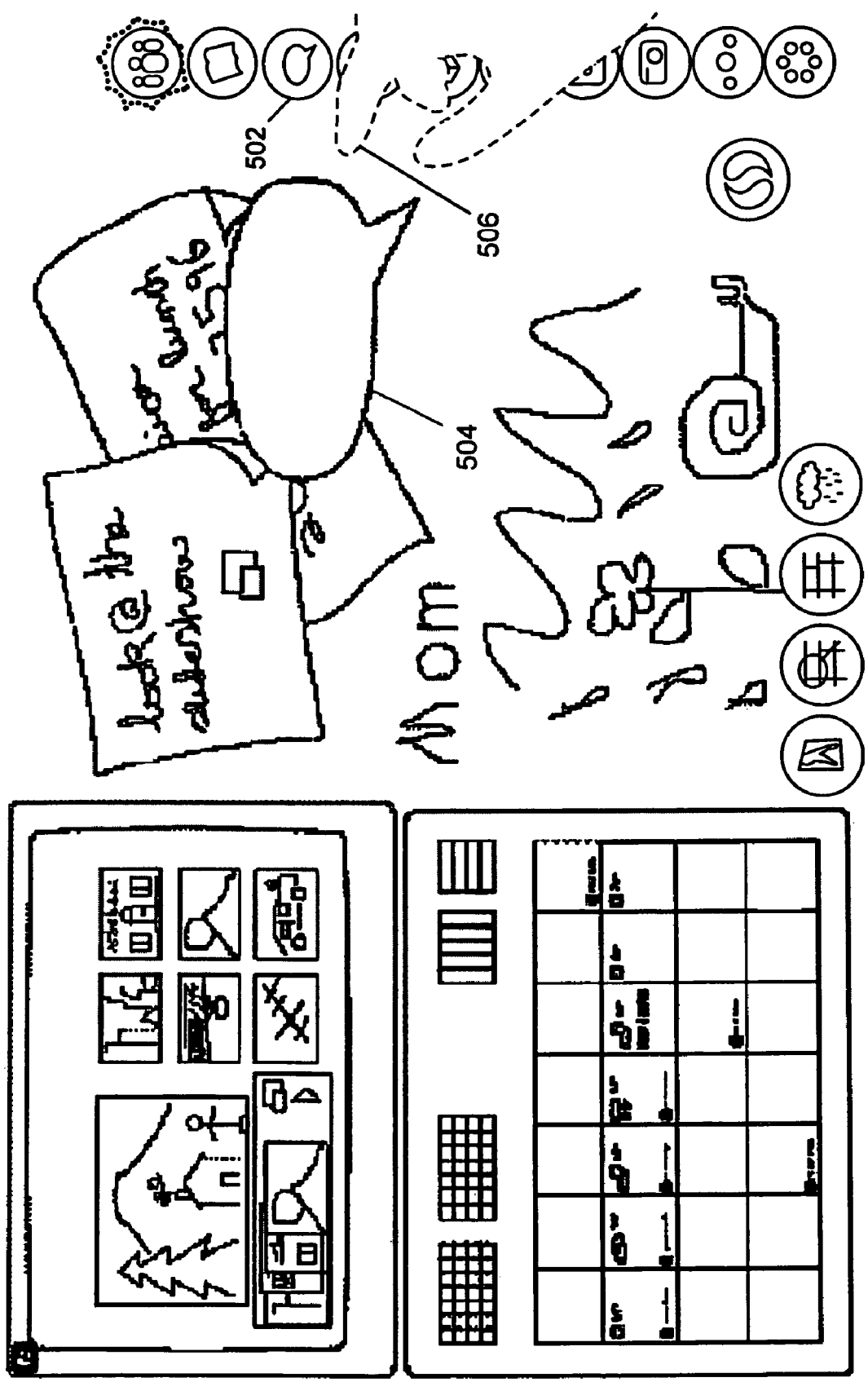
Figure 5C:
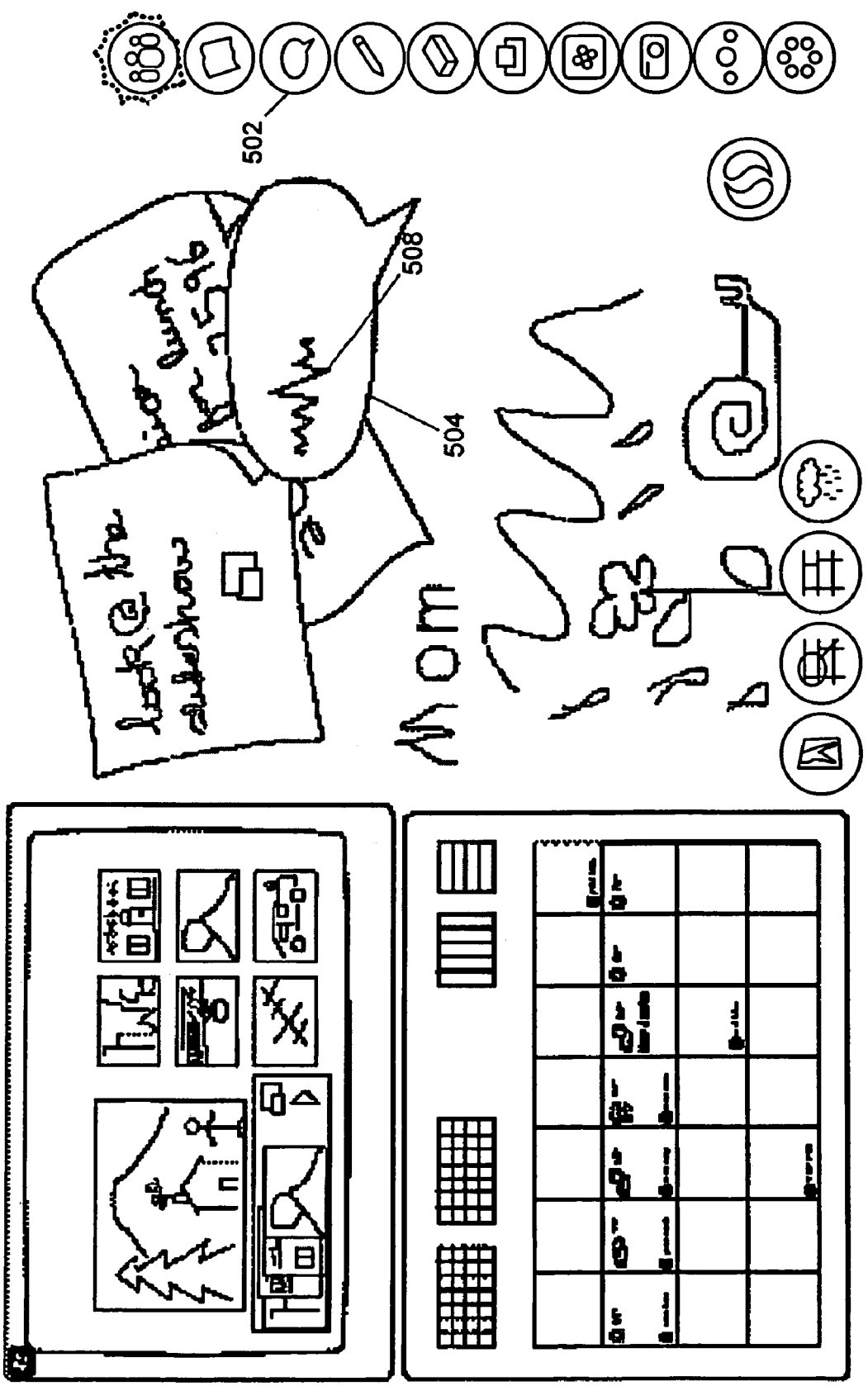
Figure 5D:
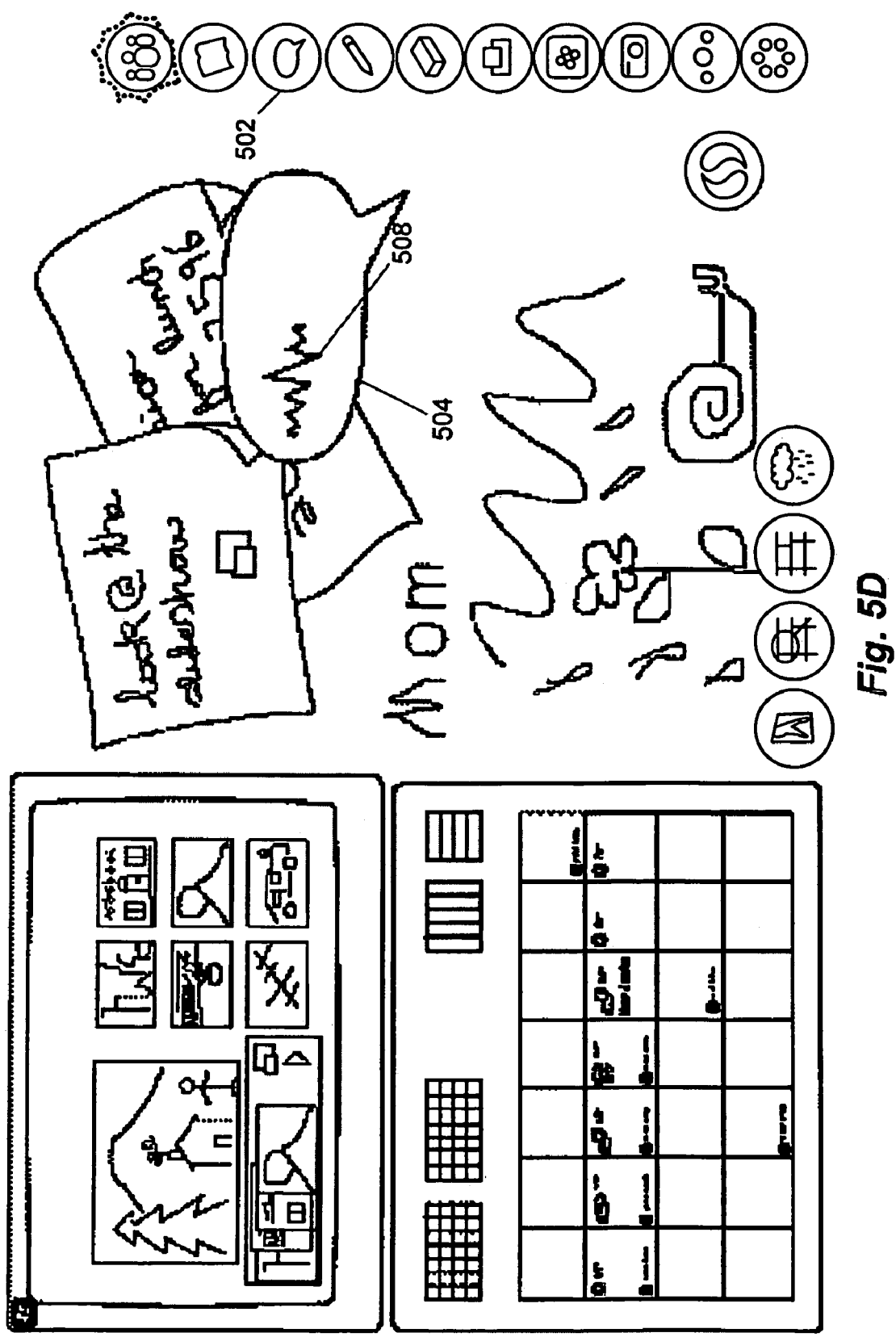
Figure 5E:
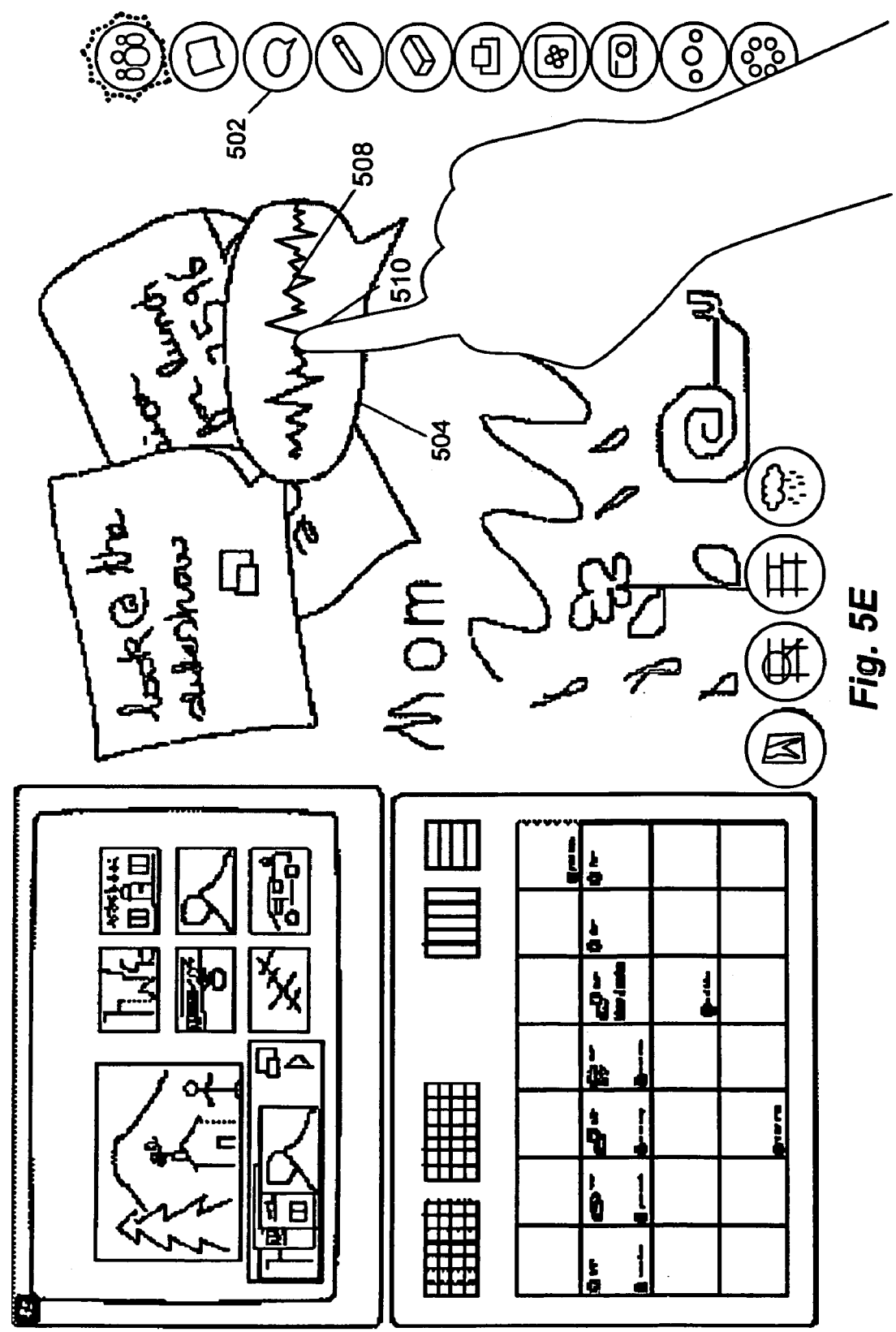
Figure 5F:
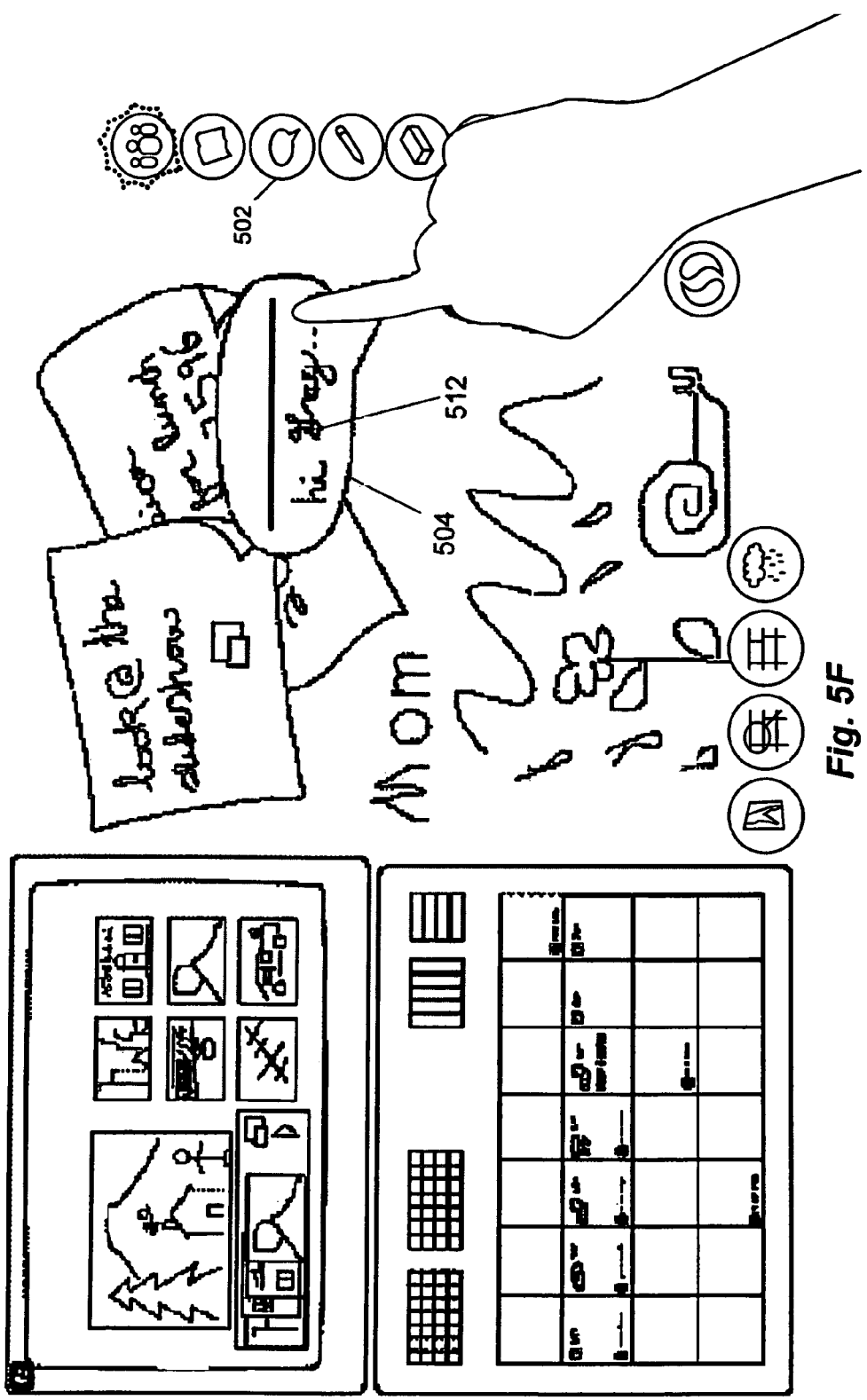
Figure 5G:
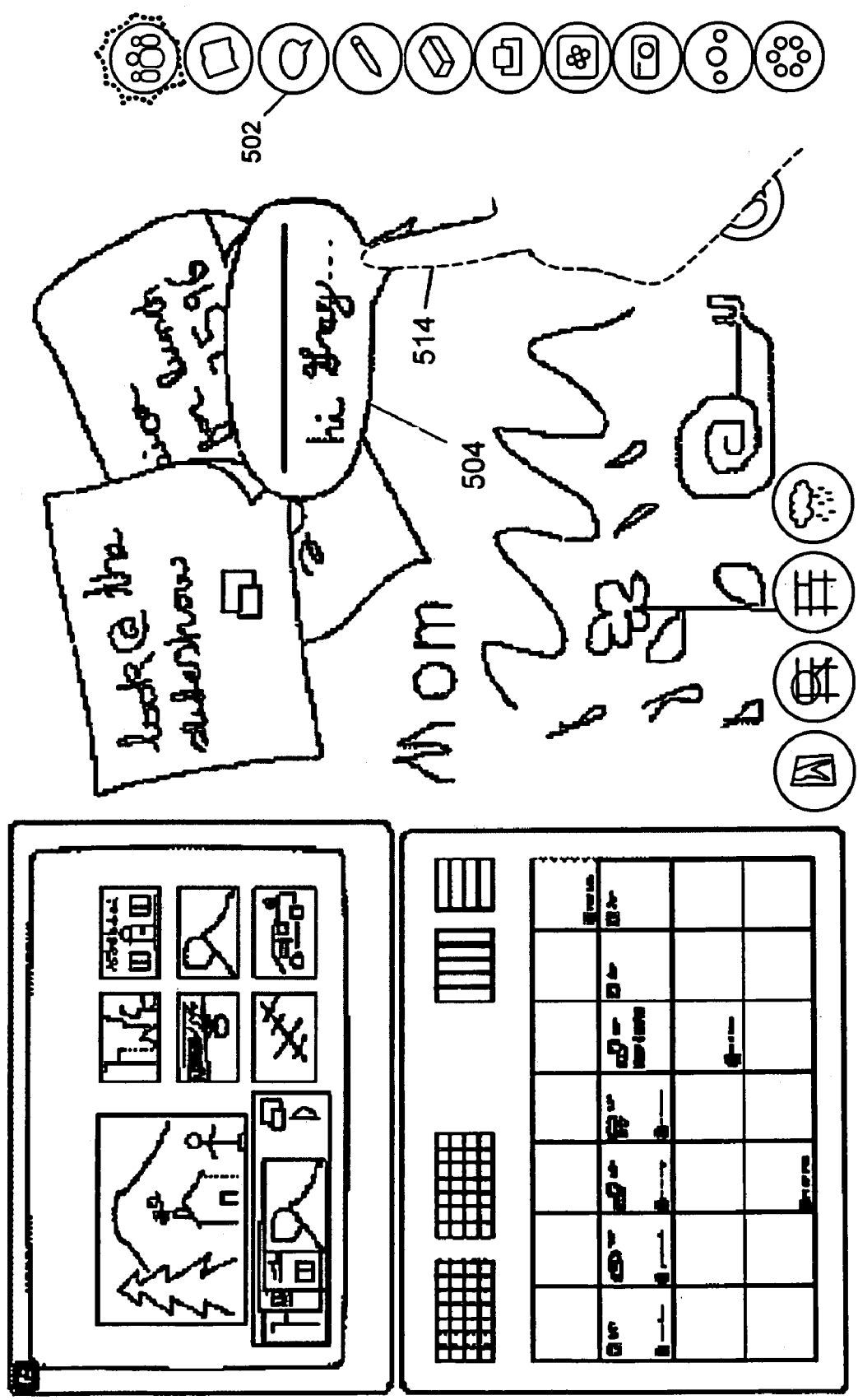
Figure 5H:
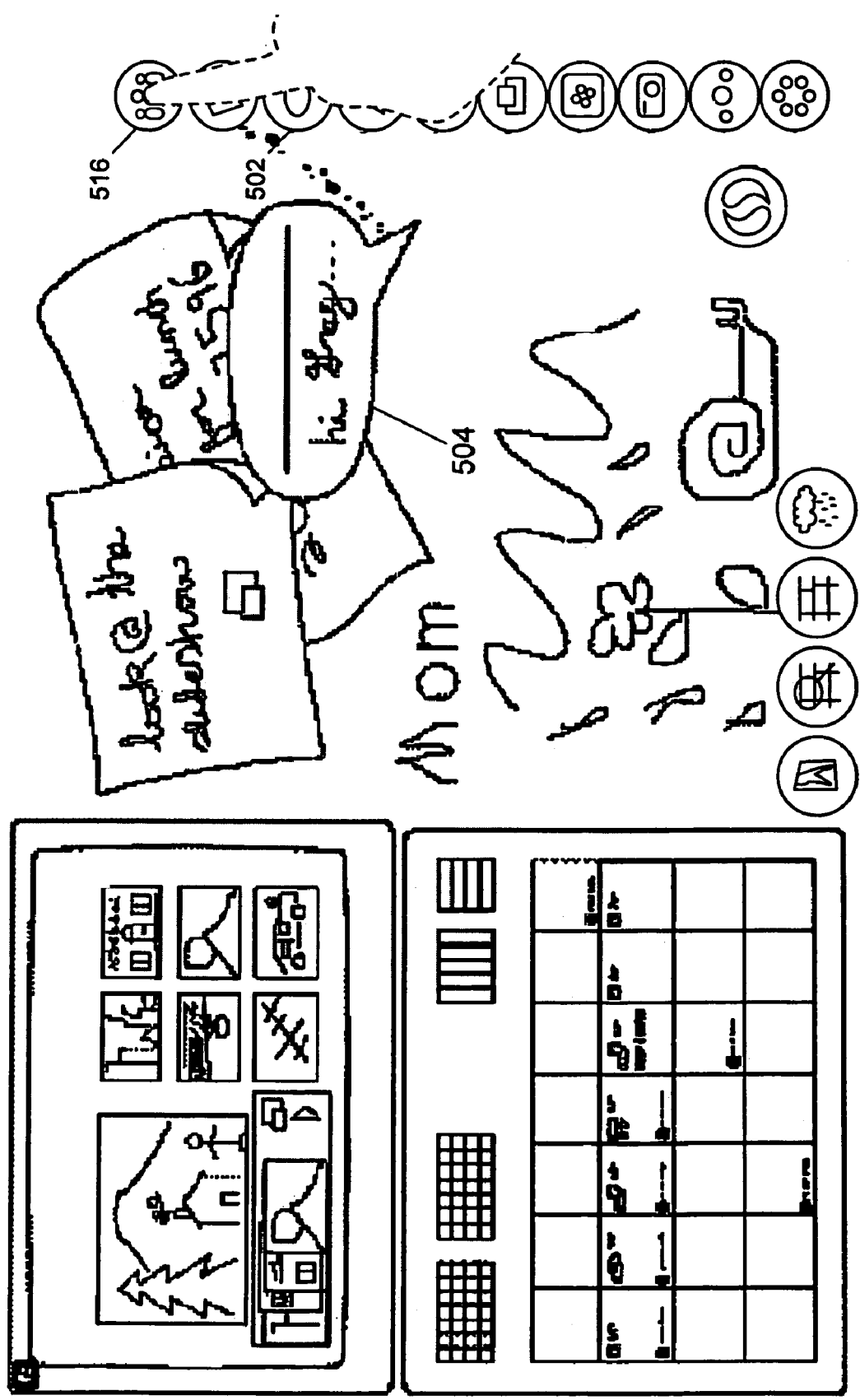
Figure 5I:
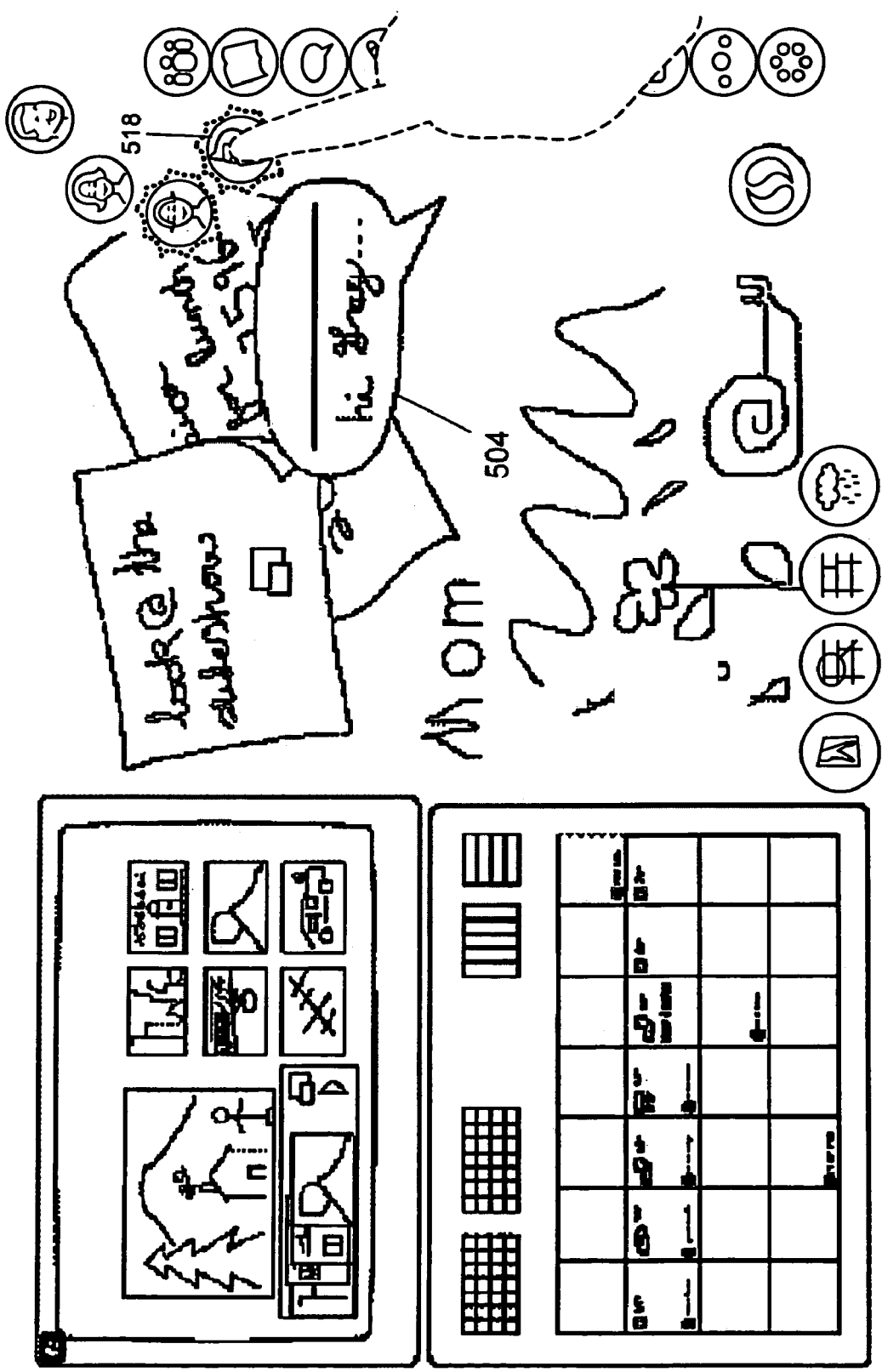

FIGS. 5A-5I depict action patterns supported by a functional user interface. FIG. 5A shows the voice note icon 502 being selected. In FIG. 5B, the voice note 504 appears and is selected by finger touch 506 although a normal cursor movement and mouse click could also be used. FIG. 5C shows the voice capture in process 508, the result of the finger touch 506 of FIG. 5B. In FIG. 5D, the voice capture is shown continuing 508. FIG. 5E depicts stopping the voice capture by a second finger touch 510. A text note 512 may be added, as depicted in FIG. 5F. In FIG. 5G, the voice note handle 514 is shown being selected, while FIG. 5H illustrates the voice note 504 being dragged to the address icon 516. FIG. 5I shows the icons of family members, or in another example, business associates, being displayed. FIG. 5I further illustrates that one of the icons 518 is selected and the addressing of the voice note 504 is complete.

Figure 6A:
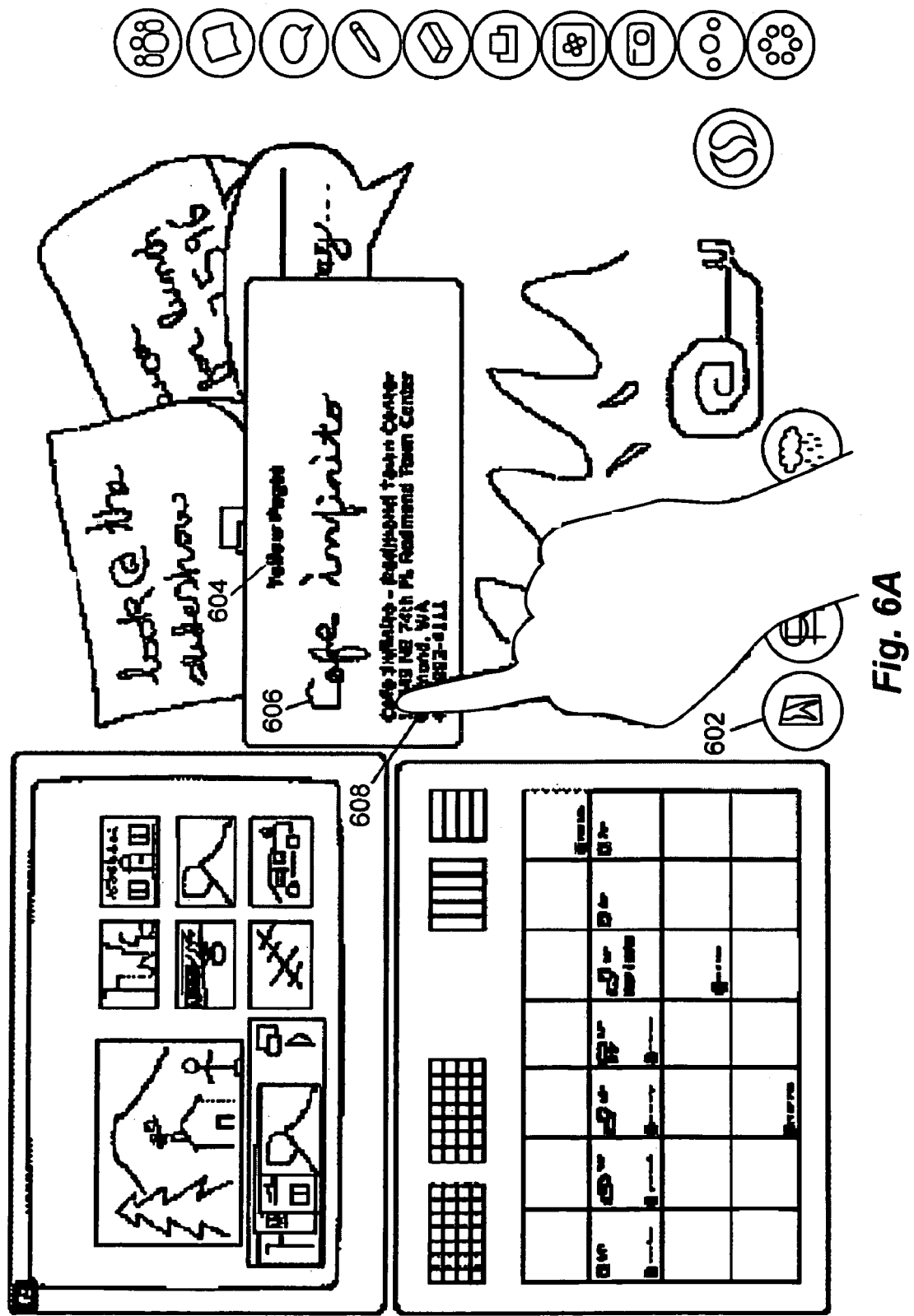
FIGS. 6A-6C depict action patterns supported by a functional user interface.
Figure 6B:
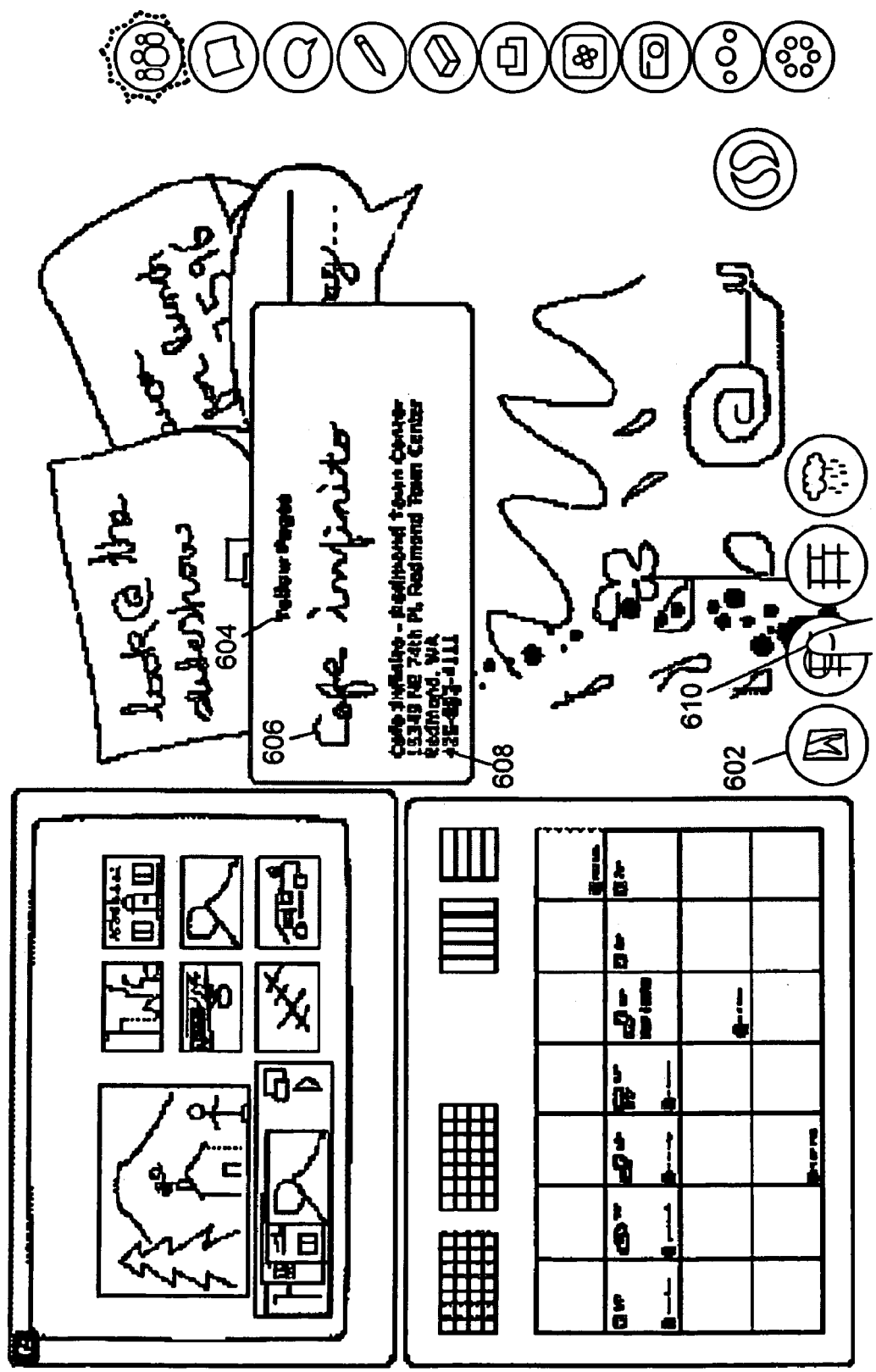
Figure 6C:
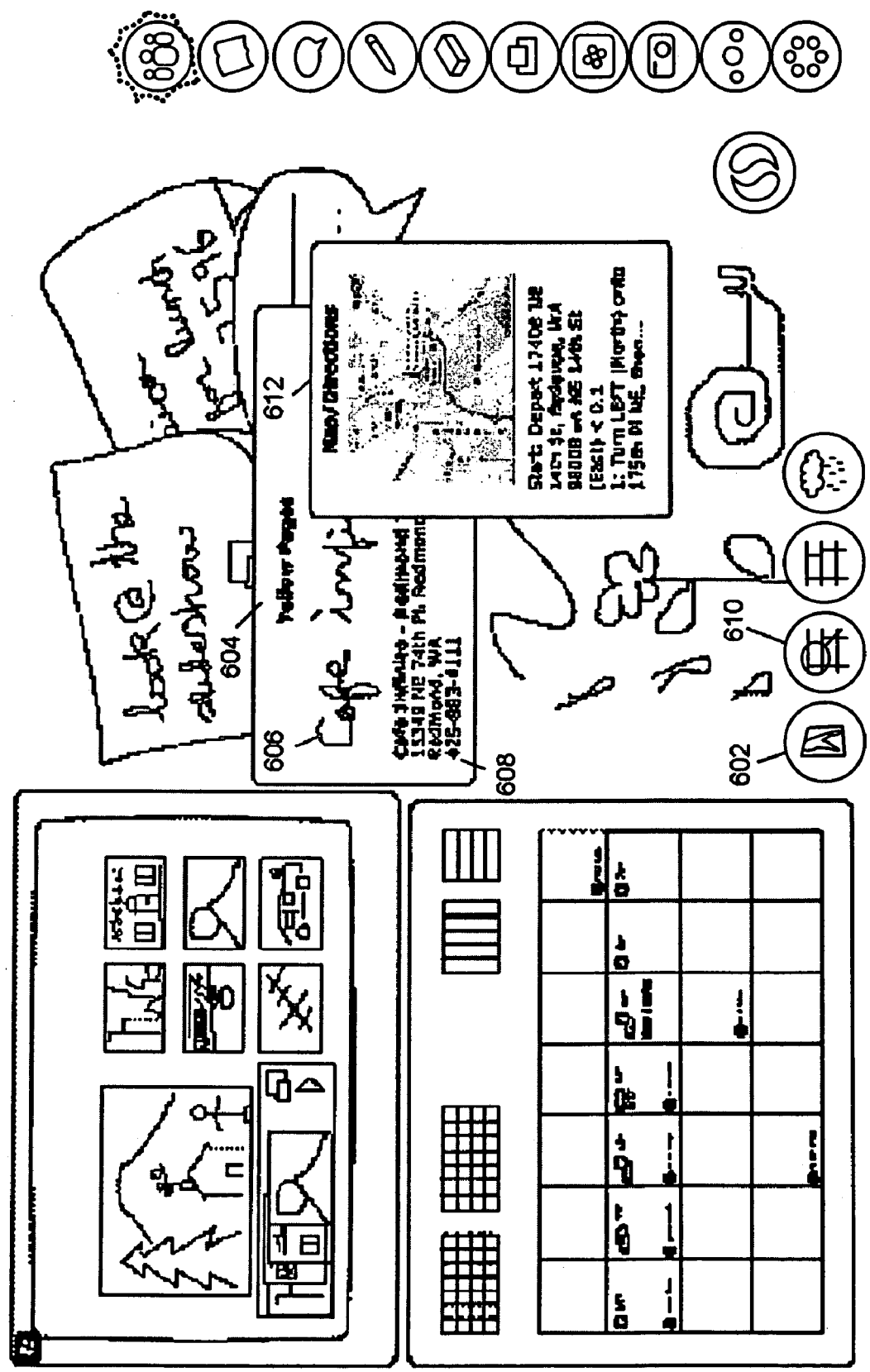

FIGS. 6A-6C depict action patterns supported by a functional user interface. FIG. 6A shows the Yellow Pages icon 602, that, when activated, yields a Yellow Pages query box 604. FIG. 6A shows a query for a restaurant name 606 and the resultant text 608 giving the name, address and phone number of a nearby match. The query box 604 may be dragged onto the directions icon 610 as shown in FIG. 6B. A resulting map and directions 612 are shown in FIG. 6C.

Figure 7A:
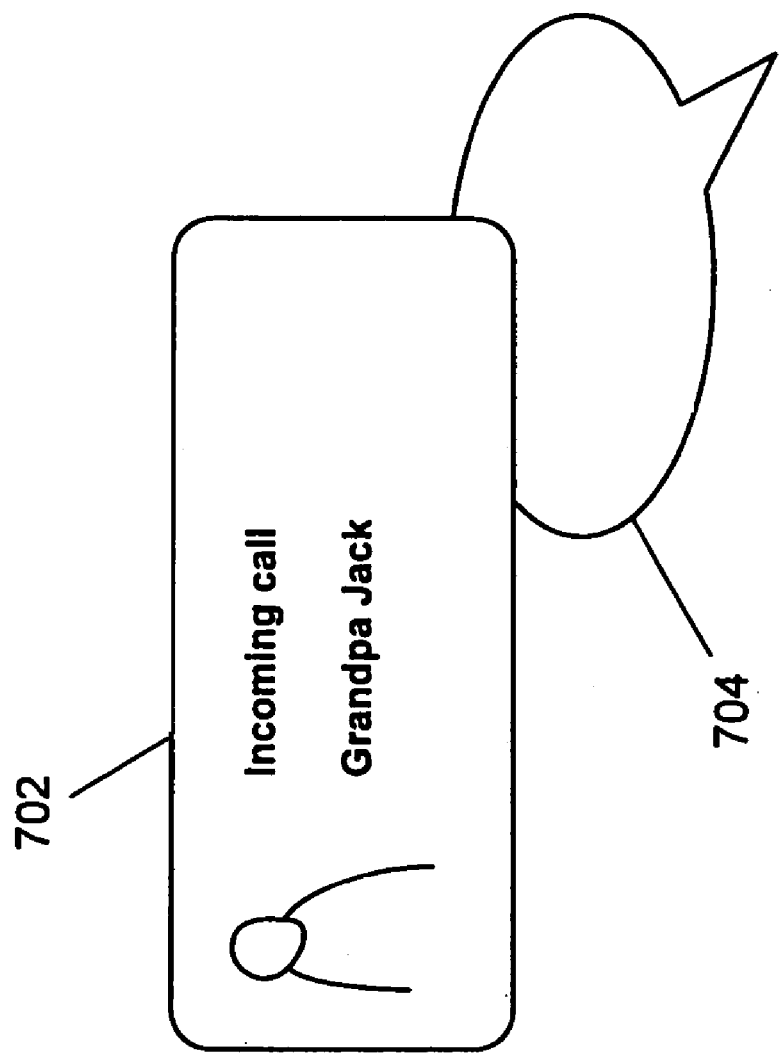
FIGS. 7A-7C depict action patterns supported by a functional user interface.
Figure 7B:
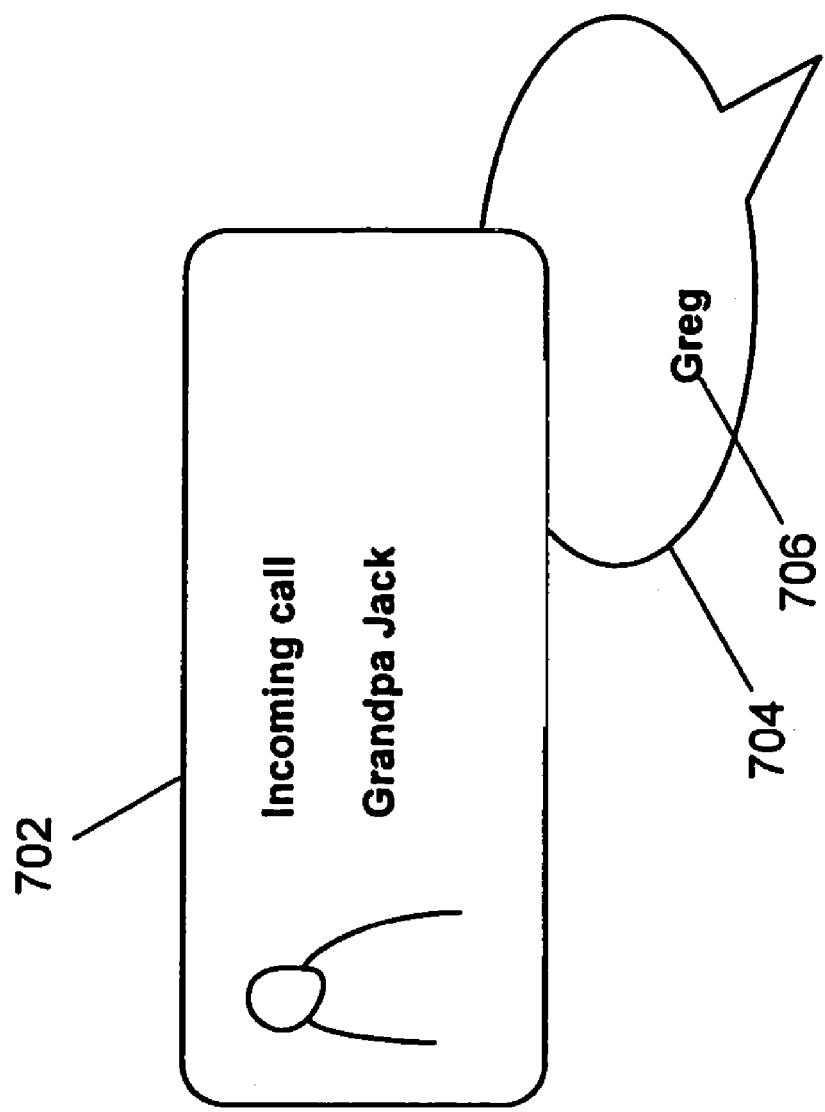
Figure 7C:
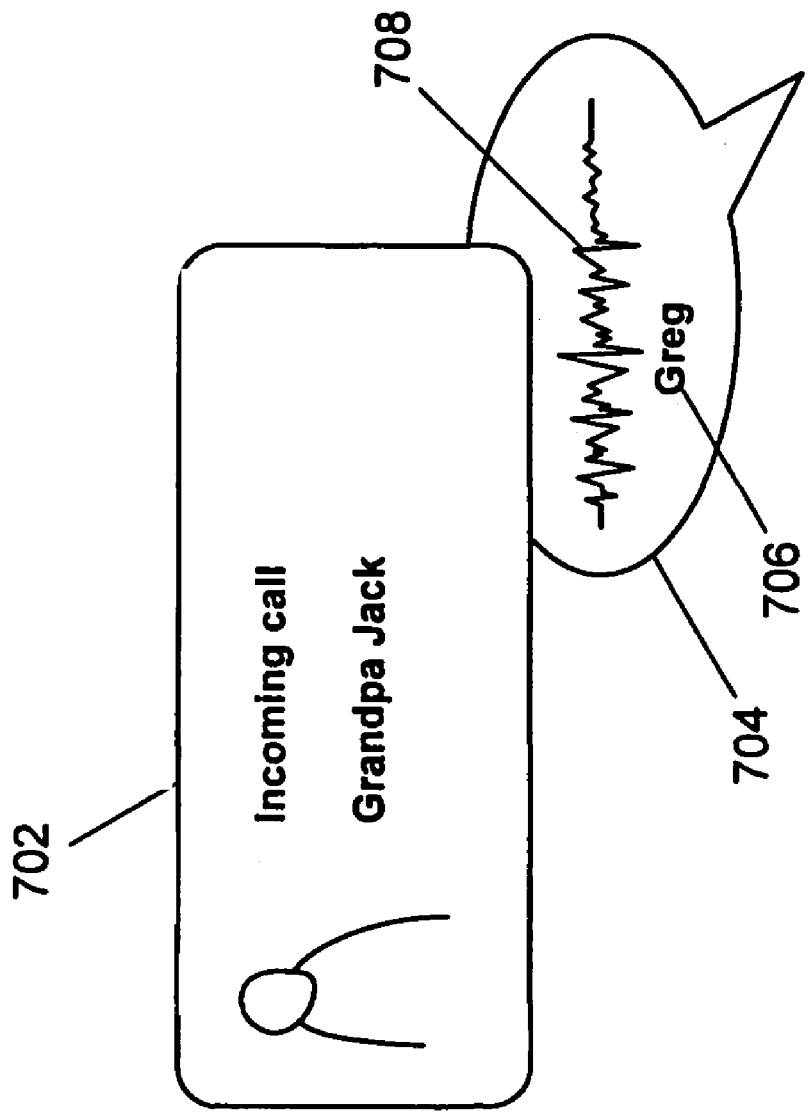

FIGS. 7A-7C depict action patterns supported by a functional user interface. FIG. 7A depicts an incoming phone call notification 702. When no one answers the call, a voice note 704 may be automatically created. FIG. 7B indicates that voice recognition or touch-tone selection may be used to address the voice note 704, in this case to "Greg" 706. FIG. 7C illustrates that the telephone message may be captured and saved 708, for later retrieval by Greg.

Figure 8A:
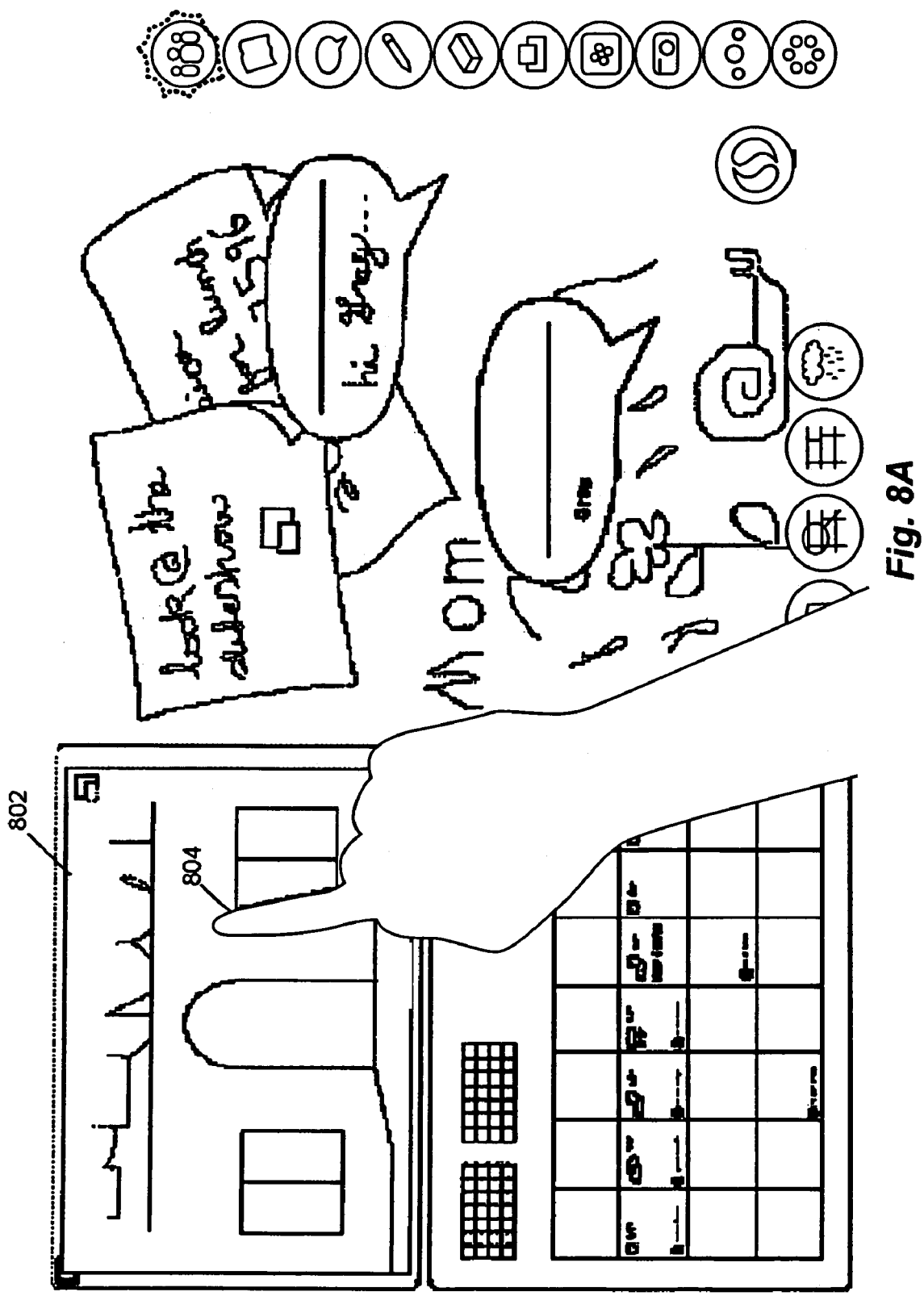
FIGS. 8A-8J depict action patterns supported by a functional user interface.
Figure 8B:
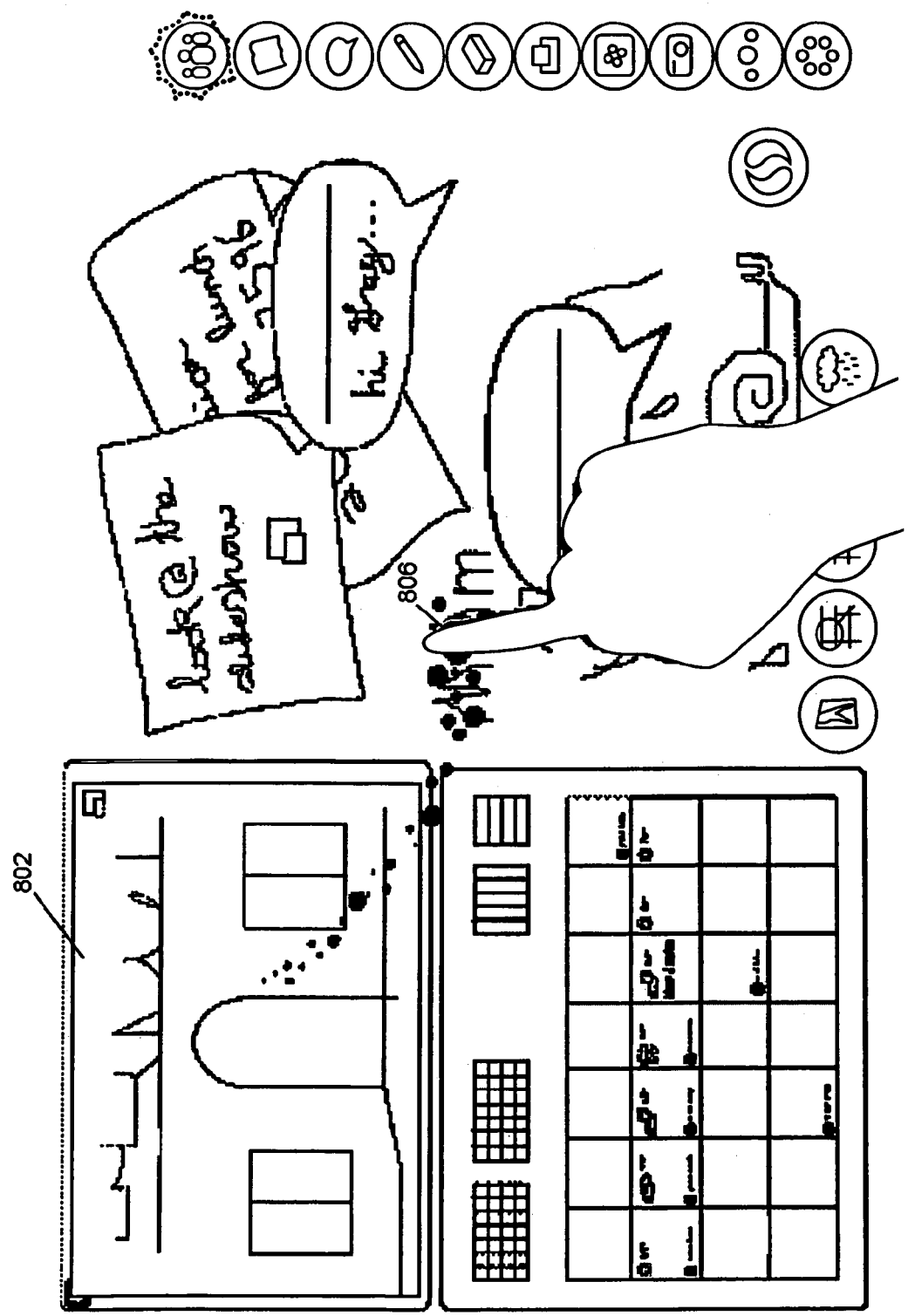
Figure 8C:
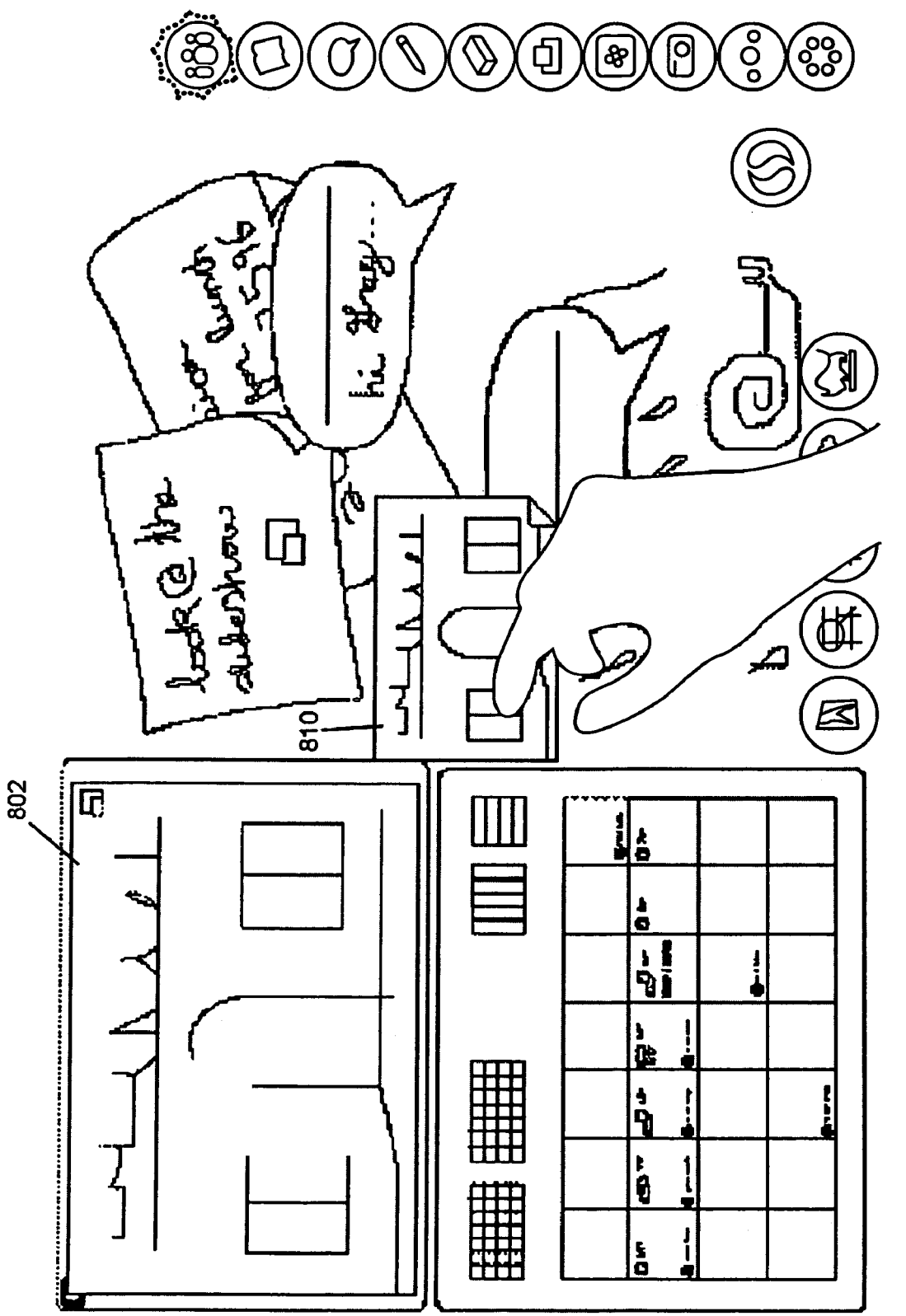
Figure 8D:
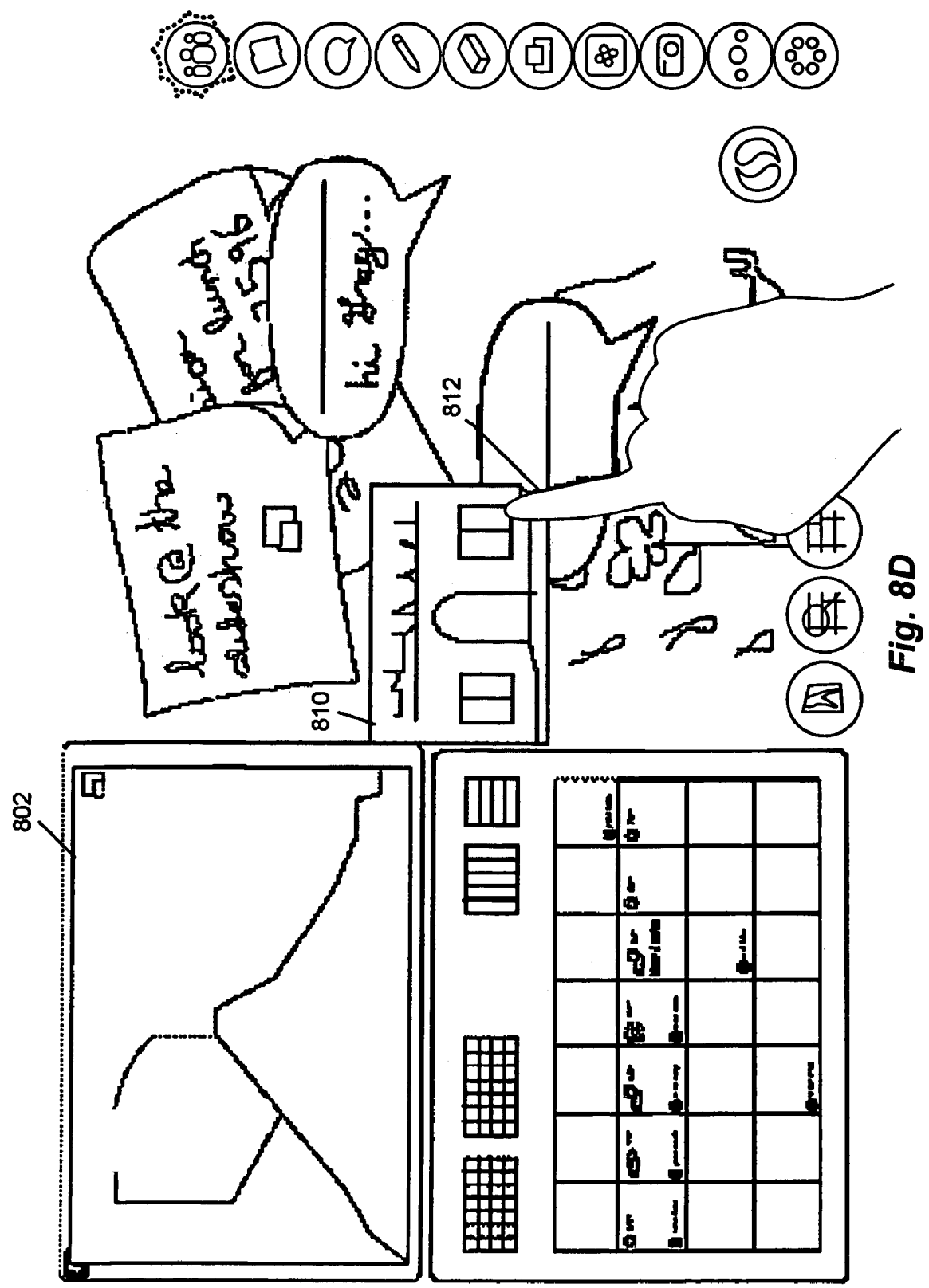
Figure 8E:
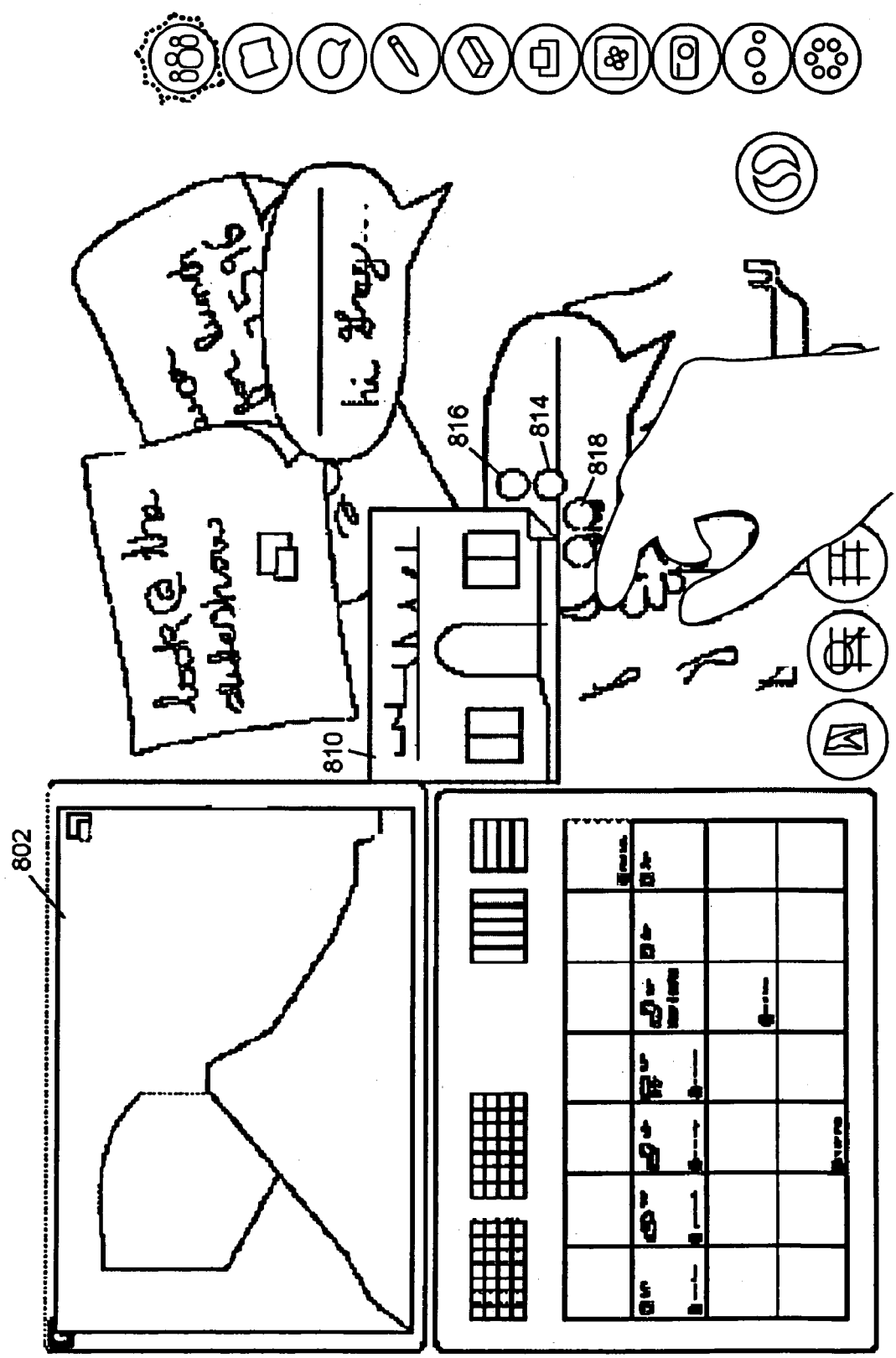
Figure 8F:
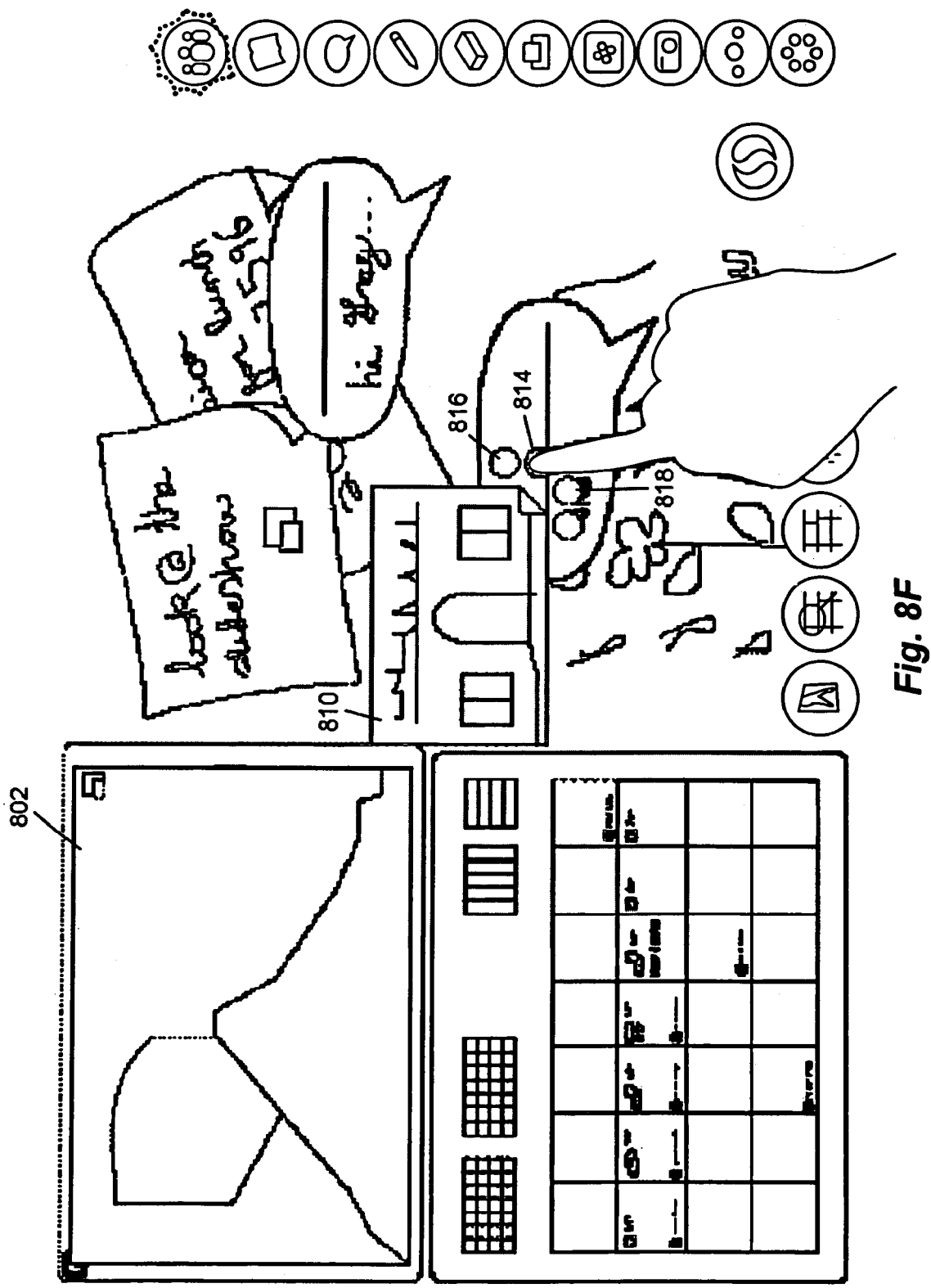
Figure 8G:
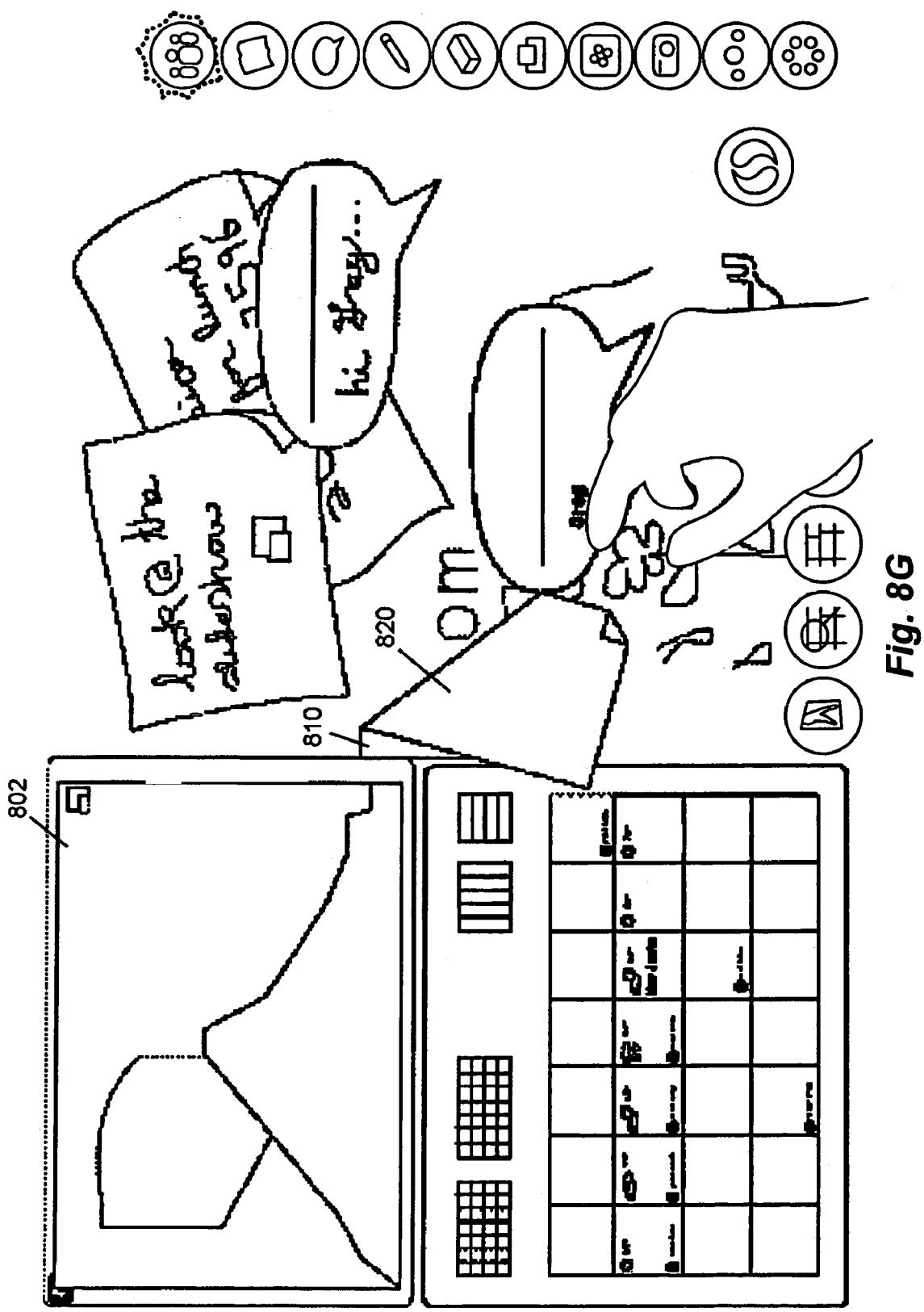
Figure 8H:
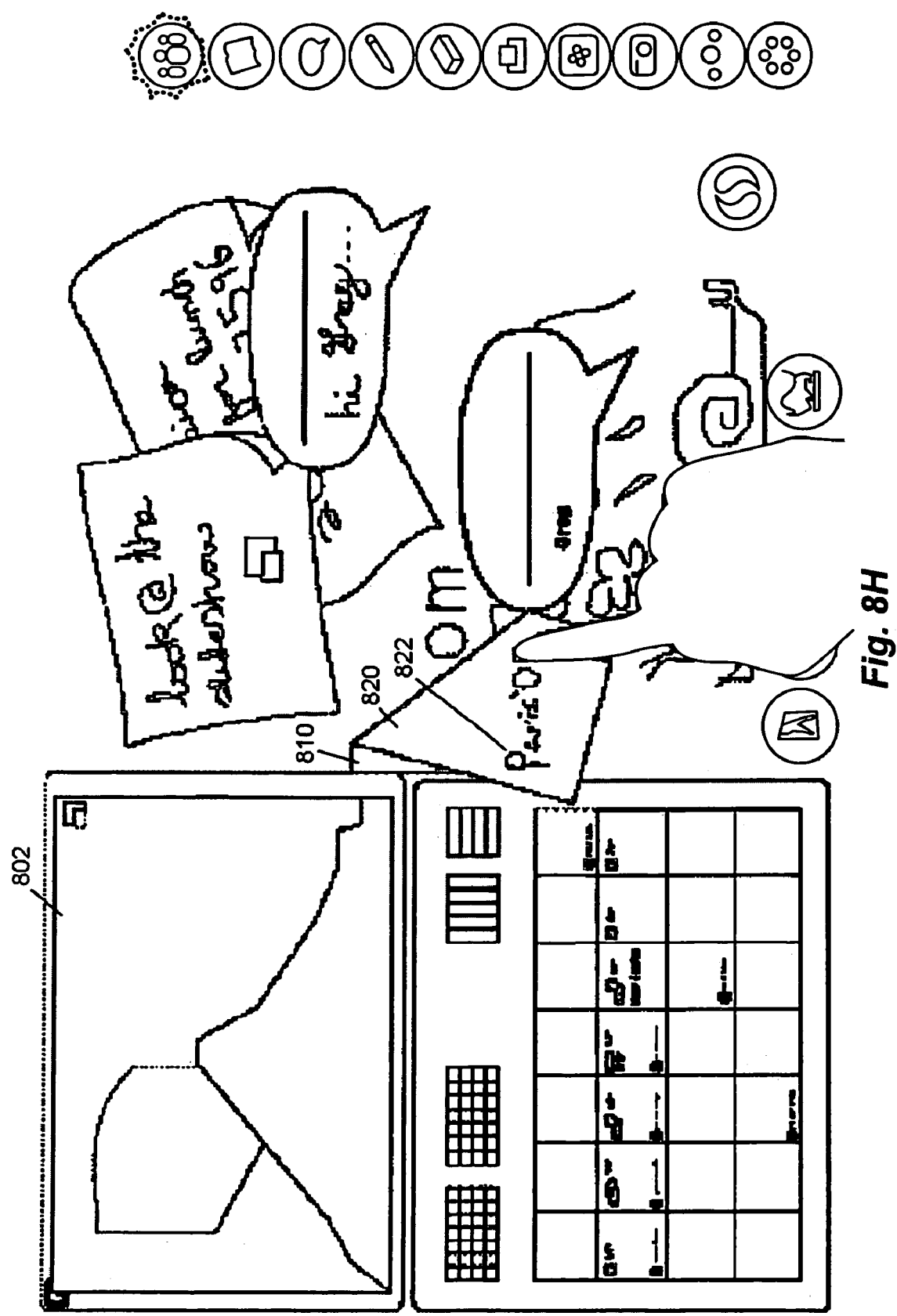
Figure 8I:
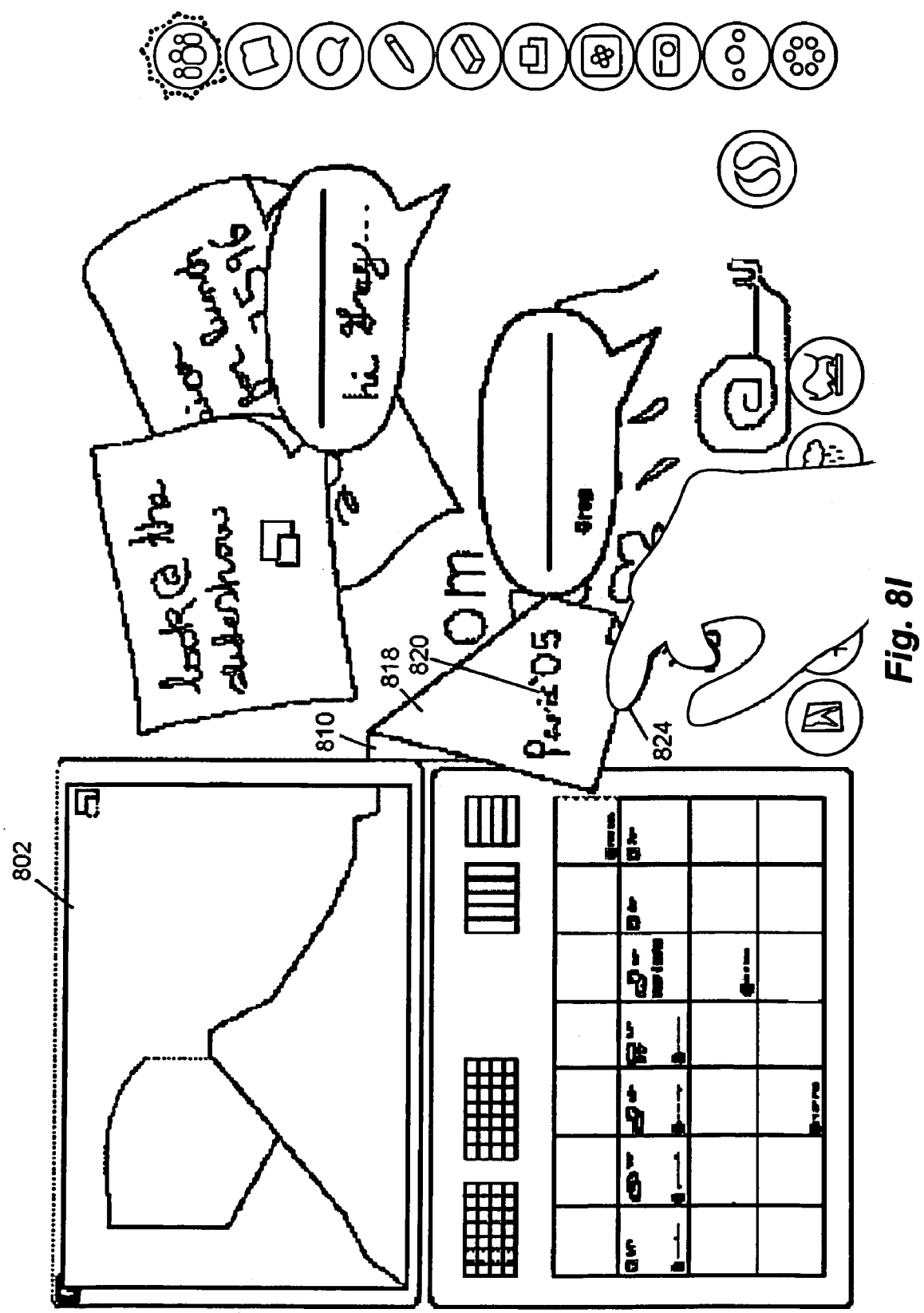
Figure 8J:
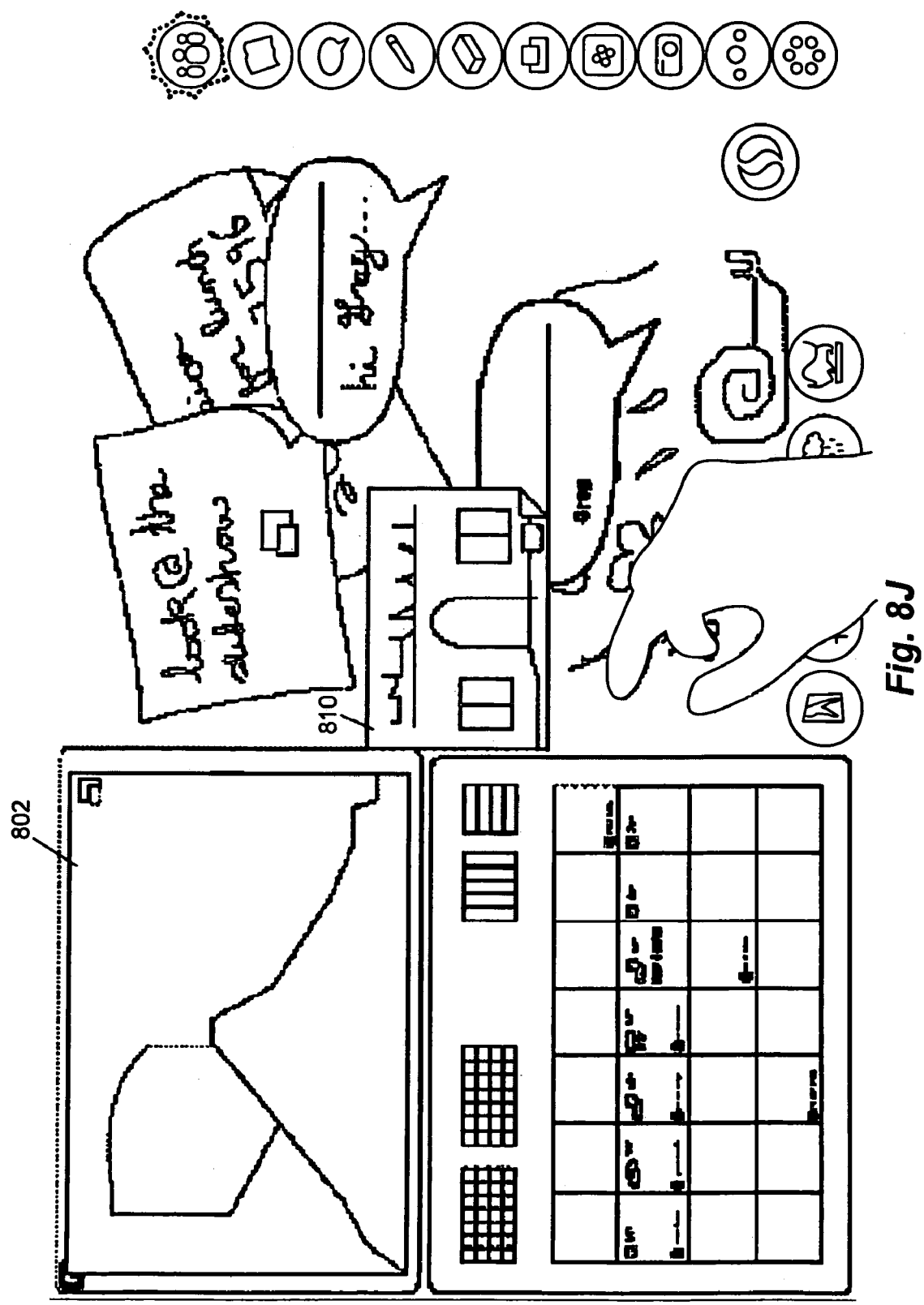

FIGS. 8A-8J depict action patterns supported by a functional user interface. FIG. 8A shows a previously selected photograph 802 being selected by a touch 804. FIG. 8B shows the picture 802 being dragged 806 to the main display or desktop. A copy 810 is shown in FIG. 8C. In FIG. 8D, the bent-corner, or action touchpoint 812 is shown being selected. FIG. 8E shows the resultant icons displayed, for example, icon 814 for adding text, and icon 816 for adding a voice note, and icon 818 for editing the picture 810. FIG. 8F depicts a touch selection of the text icon 814. FIG. 8G shows the picture 810 exposing the "back" of the picture 820, allowing a text note 822 to be added, as shown in FIG. 8H. In FIG. 8I, a second touch selection 824 may be used to 'close' the note. The updated photo 810, returned to its starting orientation is shown in FIG. 8J. Further processing using the activity icons 814, 816, or 818 may be executed, or the picture may be addressed to someone using the address icon, such as address icon 304 discussed and described in FIGS. 3A-3C.

FIGS. 2-8 illustrate several methods of using just one embodiment of a function-oriented user interface, in this case for managing simple household functions, such as calendar, notes and telephone messages for various family members. Elements, such as a blank note may have data added to them, making them a so-called "magnet." Magnets may be dragged onto a function, such as the address icon 304 of FIGS. 3A-3C. Alternatively, the magnet itself may display functional options, such as icons 814, 816 and 818 of FIG. 8F. Functions may be dragged to elements, such as the weather icon 412 being dragged to the calendar 404 of FIGS. 4A-4C. The free form association between objects and functions allows a simpler and more flexible user interface that accommodates users of different age, experience or culture to easily adapt to and successfully interact with the computer 110.

Figure 9:
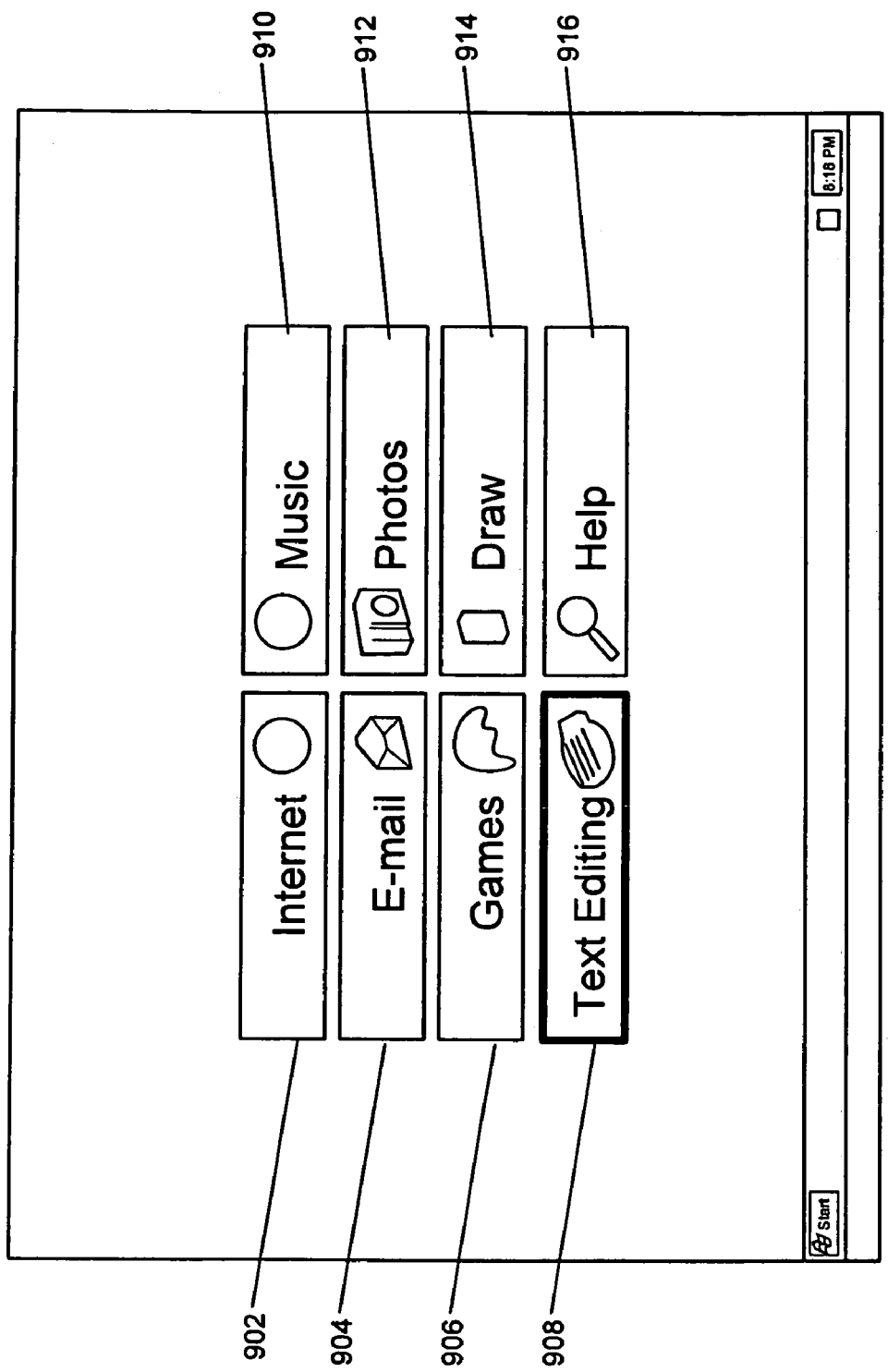
FIG. 9 depicts a function-oriented user interface.

While FIGS. 2-8 depict a special-purpose function-oriented interface, FIG. 9 depicts a more traditional computer desktop environment, suited for general purpose computing. As discussed above, however, the application and file desktop icons of prior art computer operating systems is replaced by a set of simple, function-oriented icons. In this embodiment, the icons shown are, the Internet 902, e-mail 904, games 906, text editing 908, music 910, photos 912, drawing 914, and help 916.

Figure 9A:
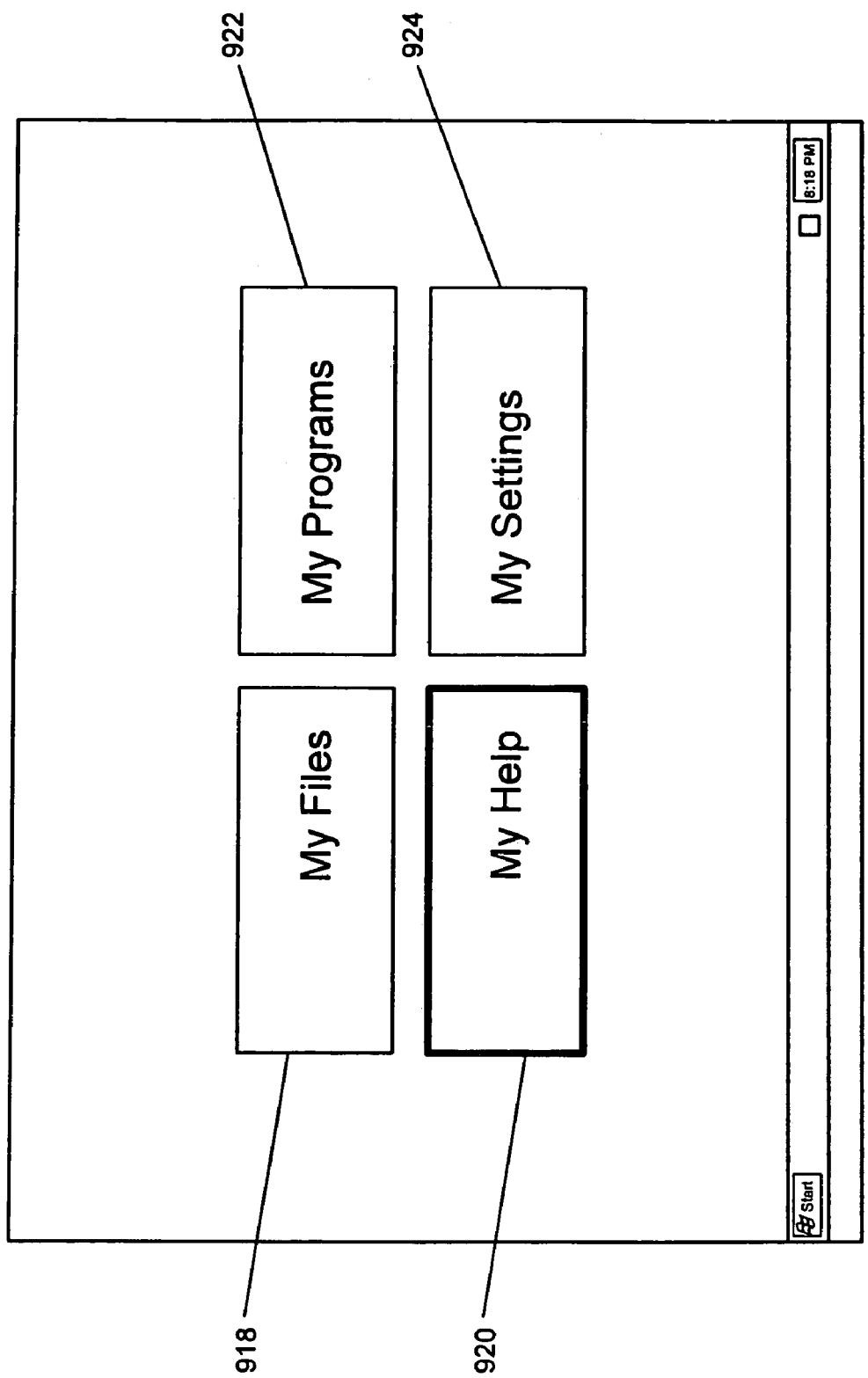
FIG. 9A depicts an alternate function-oriented user interface.

FIG. 9A depicts an alternative function-oriented user interface, providing fewer selections than that of FIG. 9 and more oriented to an individual user's view of computing. The simplified four icon interface may use icons for My Files 918, My Help 920, My Programs 922, and My Settings 924.

Figure 10:
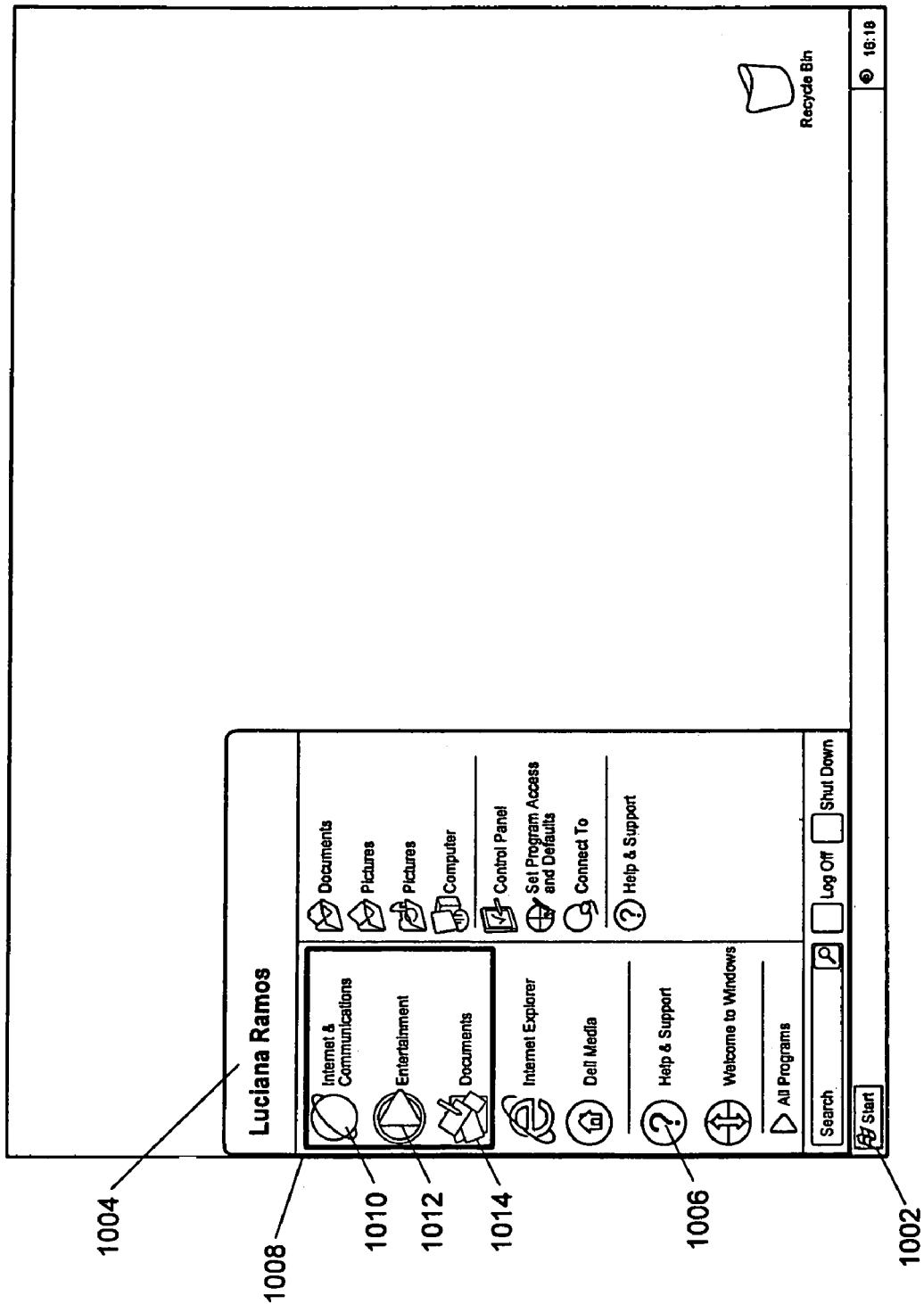
FIG. 10 depicts an alternate presentation of a function-oriented user interface.

FIG. 10 depicts a third alternative to a traditional desktop interface having a function-oriented user interface. Clicking on the start menu 1002 may give a pop-up menu 1004, with some traditional icons, such as help 1006. A 'pillars of computing' box 1008 may be added to the prior art pop-up showing three of previously described main user functions, Internet and Communications 1010, Entertainment 1012, and Documents 1014. This gives even novice users a-simple and direct way to access functions most common to one major classification of users as either business, entertainment, or home. Obviously, a business user during the day may become the entertainment user of the evening, the interface appeals equally to mixed use and dedicated use.

Figure 11A:
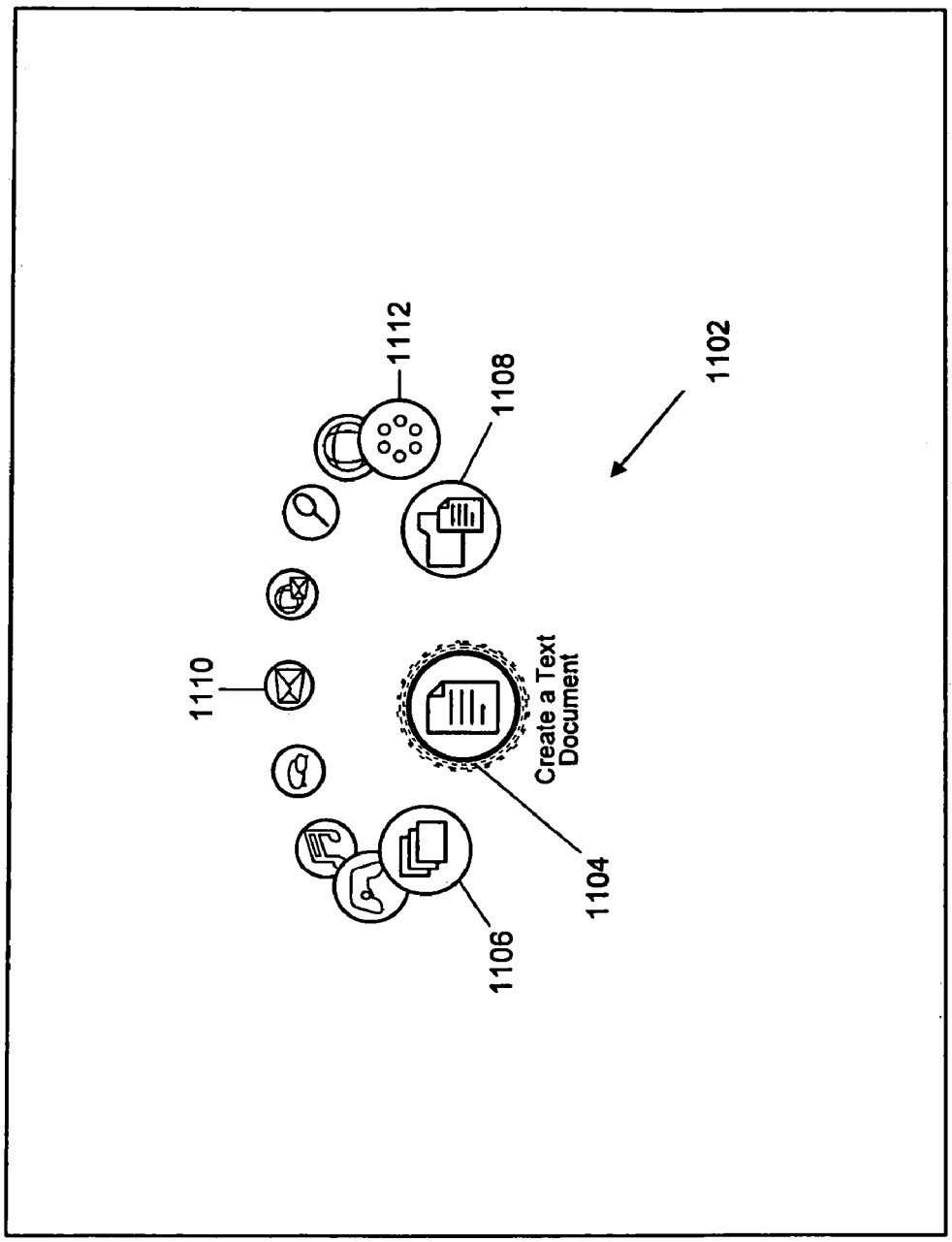
FIG. 11 depicts an alternate presentation of a function-oriented user interface.

FIG. 11A depicts an alternate presentation of a function-oriented user interface, discussed above as an orb 1102. The orb 1102 may be rotated in either direction through simple cursor control, with the forward-most element highlighted and ready for selection. The glow effect is made by selecting a transparent color for the "glow" color to depict shining from behind. In addition, the glow color is painted beyond the edges of the highlighted icon, different from current icons which may change color or shade, but keep the same outline. Shown forward-most is a text document icon 1104. Various other icons representing additional elements are shown for photographs 1106, archive/existing documents 1108, email 1110, and, an options icon 1112.

Figure 11B:
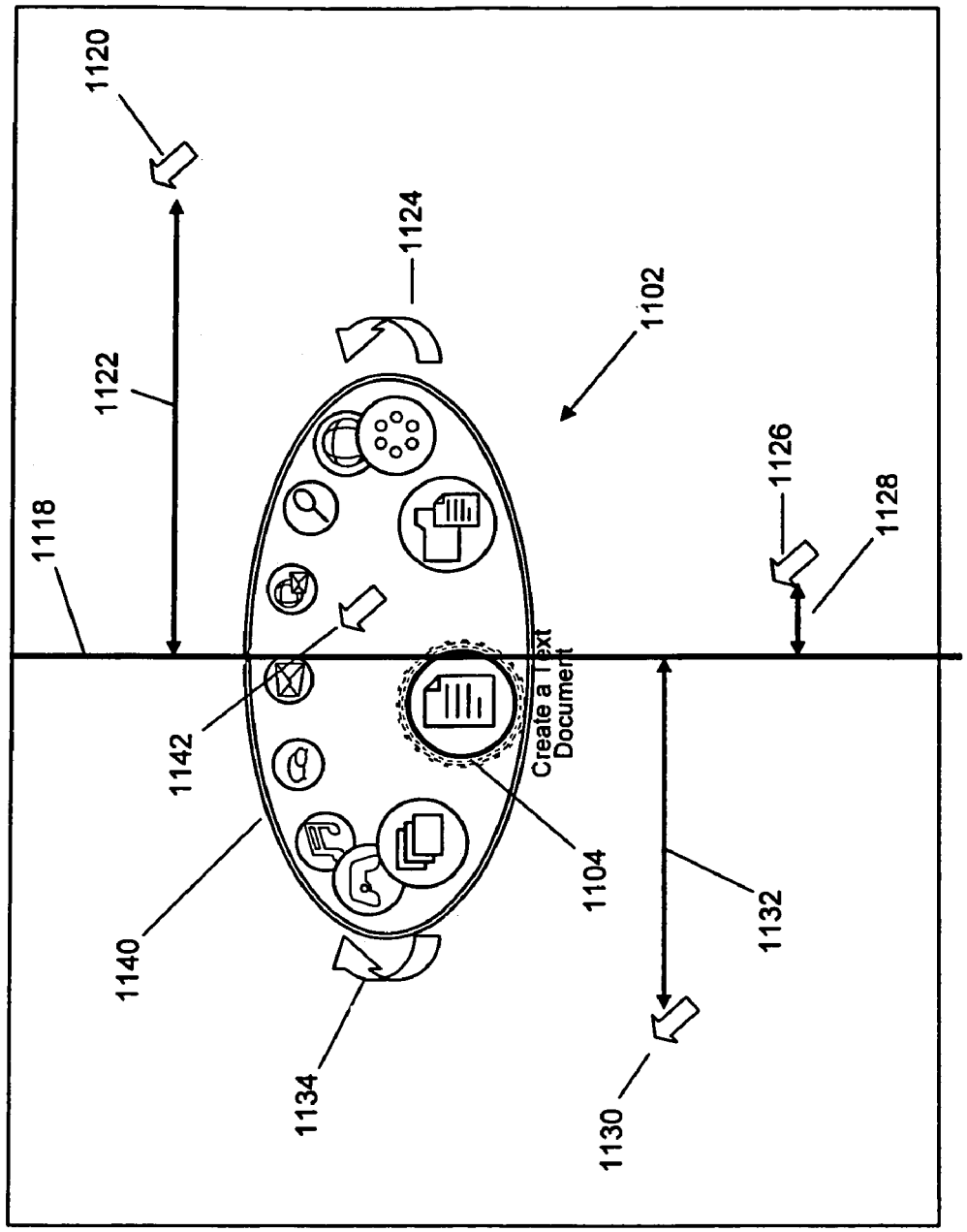

FIG. 11B depicts one exemplary embodiment for effecting rotation of the orb 1102. An imaginary centerline 1118 may be placed coincident with a centerline of the orb 1102. A cursor, shown in position 1120 is a distance from the centerline 1118 as shown by index 1122. When the cursor is to the right of the centerline 1118, the orb may spin to the right, as depicted by arrow 1124. The cursor is shown in a second position 1126, a distance to the right of the centerline depicted by line 1128. When the cursor is farther to the right of the centerline 1118, that is distance 1122, the orb may spin faster than when the cursor is closer to the centerline 1118, as depicted by distance 1128. A third cursor position 1130 is shown a distance 1132 to the left of the centerline 1118. The orb 1102 may then spin to the left as depicted by arrow 1134. Again, the distance of the cursor from the centerline may control the speed of the rotation of the orb 1102.

In one embodiment, when the cursor is inside a circumference 1140 of the orb 1102, for example, at cursor position 1142, the orb 1102 may stop spinning to allow easier selection of the desired icon and its corresponding function. The front-most orb, in this case, 1104 may be highlighted, indicating it is the default for selection, for example, using the "enter" key. Moving the cursor over any other icon may change the highlighting to the current "mouse over" icon, thereby changing the default icon selection.

Figure 11C:
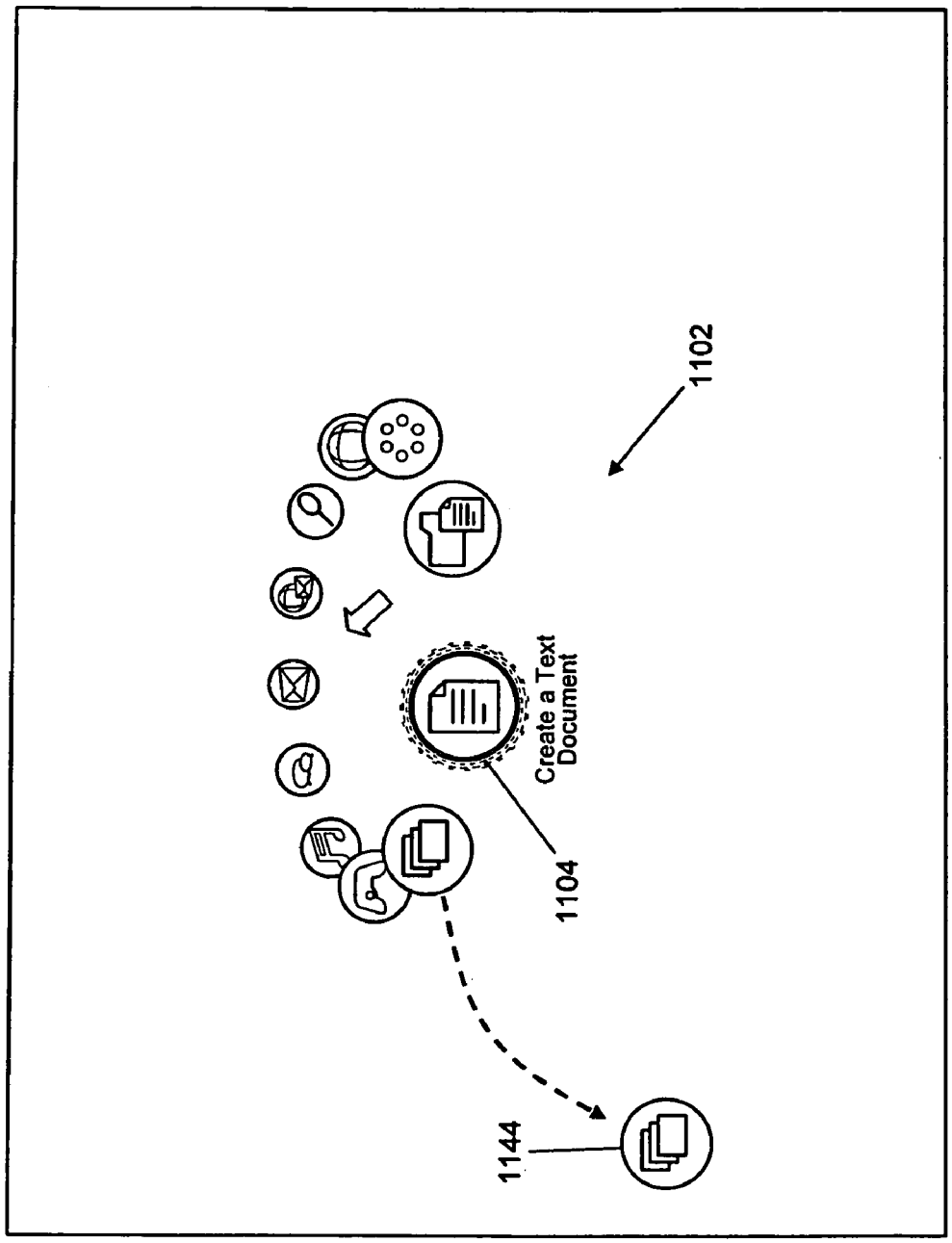

FIG. 11C depicts another exemplary interaction with the orb 1102. One or more icons may be dragged from the orb 1102, for example, orb 1144, and placed on the desktop. The remaining icons in the orb 1102 may reform to fill the resultant gap and maintain a more or less uniform spacing. Other options may be implemented, for example, the icon 1144 may remain in the orb 1102 and the icon 1144 may be copied to the desktop.

Figure 12:
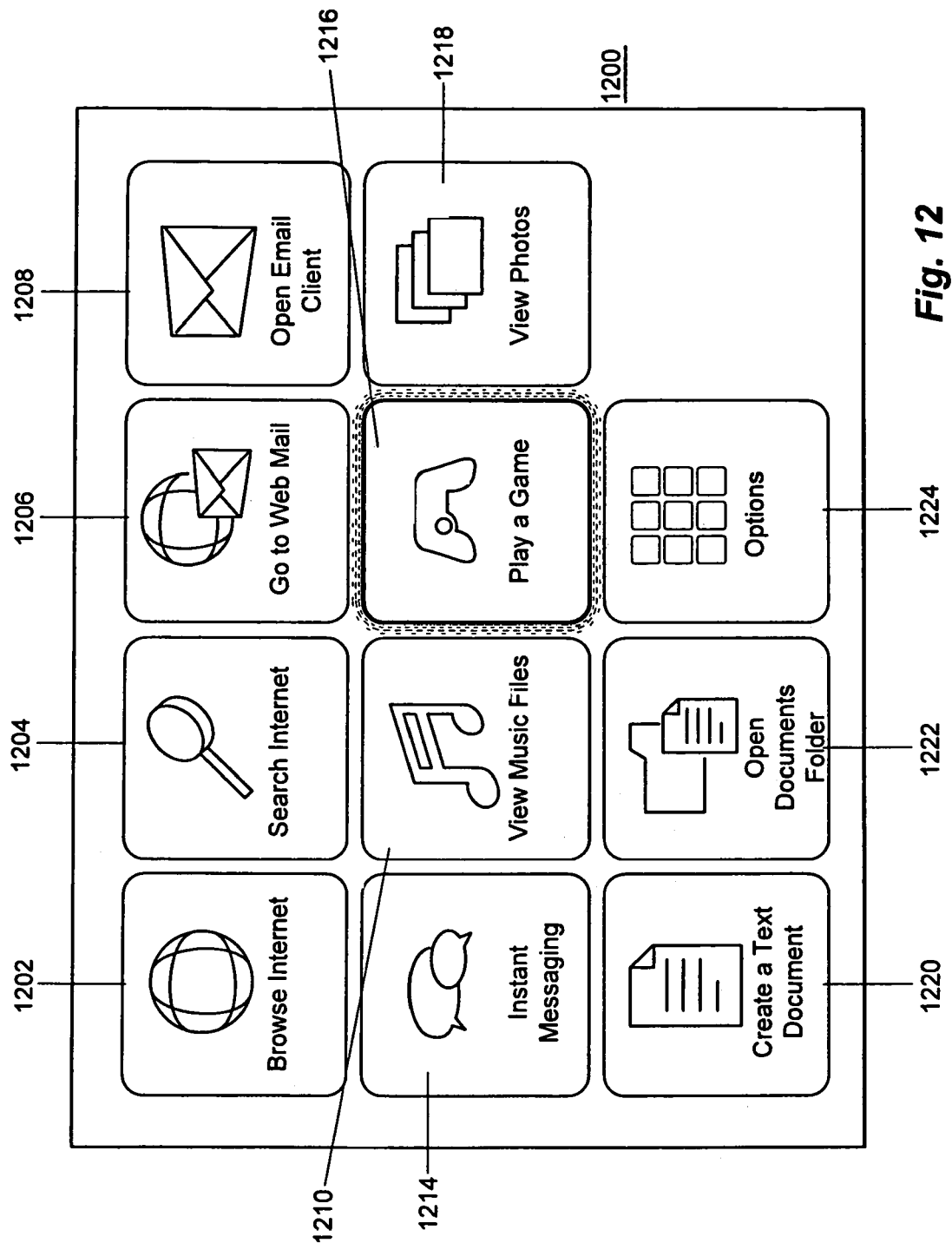
FIG. 12 depicts a second form of the user-interface of FIG. 11.

FIG. 12 depicts an second form of the user-interface of FIG. 11, showing text and picture depictions of associated functions arranged in a grid fashion. The exemplary embodiment shown has icons representing functions for Internet browsing 1202, searching the Internet 1204, web-email 1206, client-based email 1208, music 1210, instant messaging 1214, games/entertainment 1216, photographs 1218, document editing 1220, document management 1222, and options 1224. Selection of the icons in the grid may be made by "mouse over" action or by using the "tab" key to move through the selections.

Figure 13:
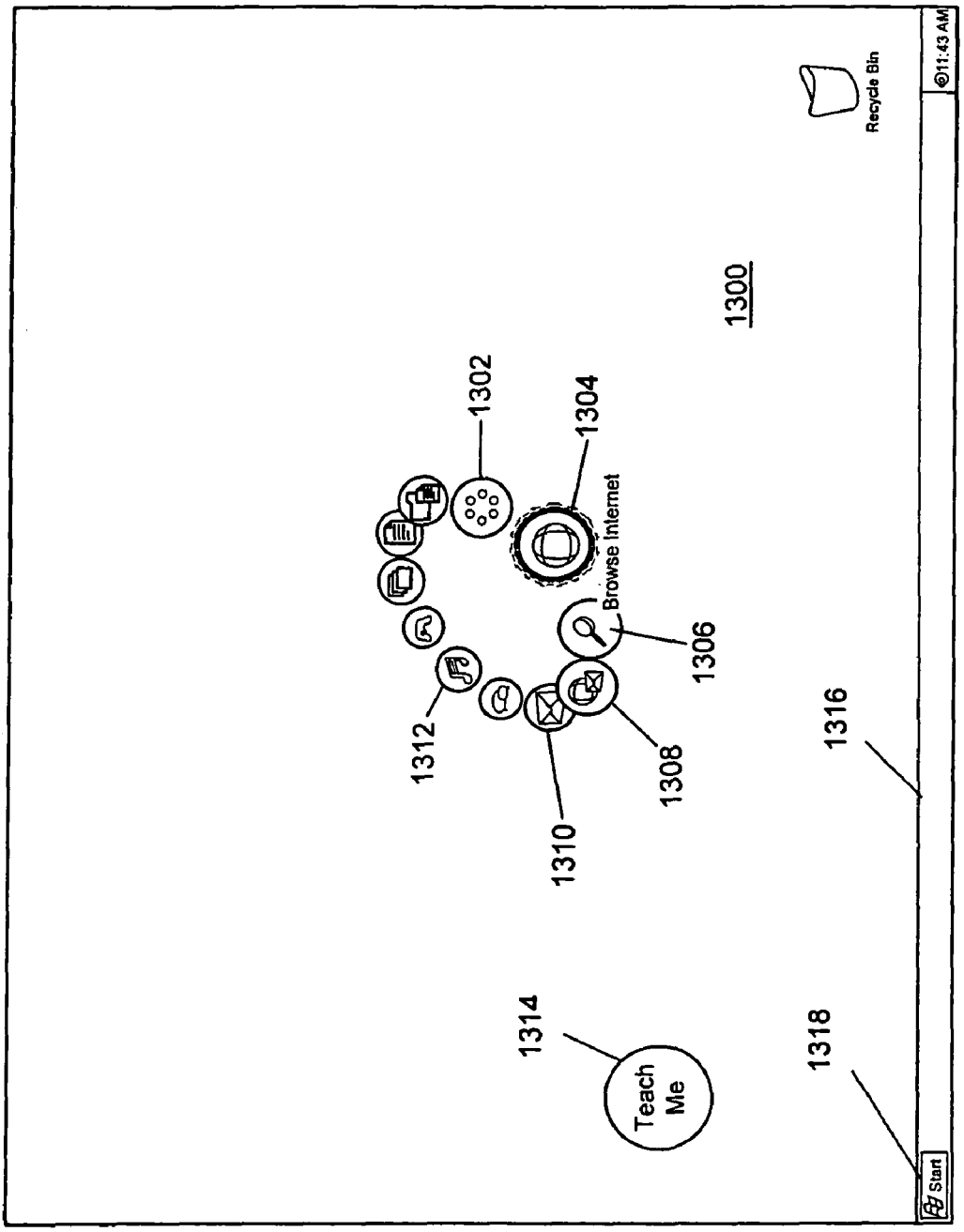
FIG. 13 depicts a third form of the user-interface of FIG. 11.

FIG. 13 depicts a third form of the user-interface of FIG. 11, showing that the orb 1300 may be shifted and scaled to more easily fit the space available. The rotation of elements of the orb to the front allows access to any function even when the orb is scaled or elongated such that functions in the back may not be easily distinguished. Exemplary elements of the orb 1300 are options 1302, Internet browsing 1304, Internet search 1306, web mail 1308, email 1310, and music 1312, although this list is not inclusive of all current or potential functions available to a user. A additional icons (not depicted) may include a "Teach Me" icon. When in the "Teach Me" mode, clicking a designated icon 1314 may be used to show a user how to interact with the menu bar 1316, by not only starting an appropriate application, but by leading the user through the functional menu steps associated with that activity. For example, selecting the "Browse Internet" icon 1304, may automatically move the cursor to the Start button 1318, open the Programs menu (not depicted) and highlight and activate an appropriate program, such as the Microsoft Internet Explorer™.

Figure 14:
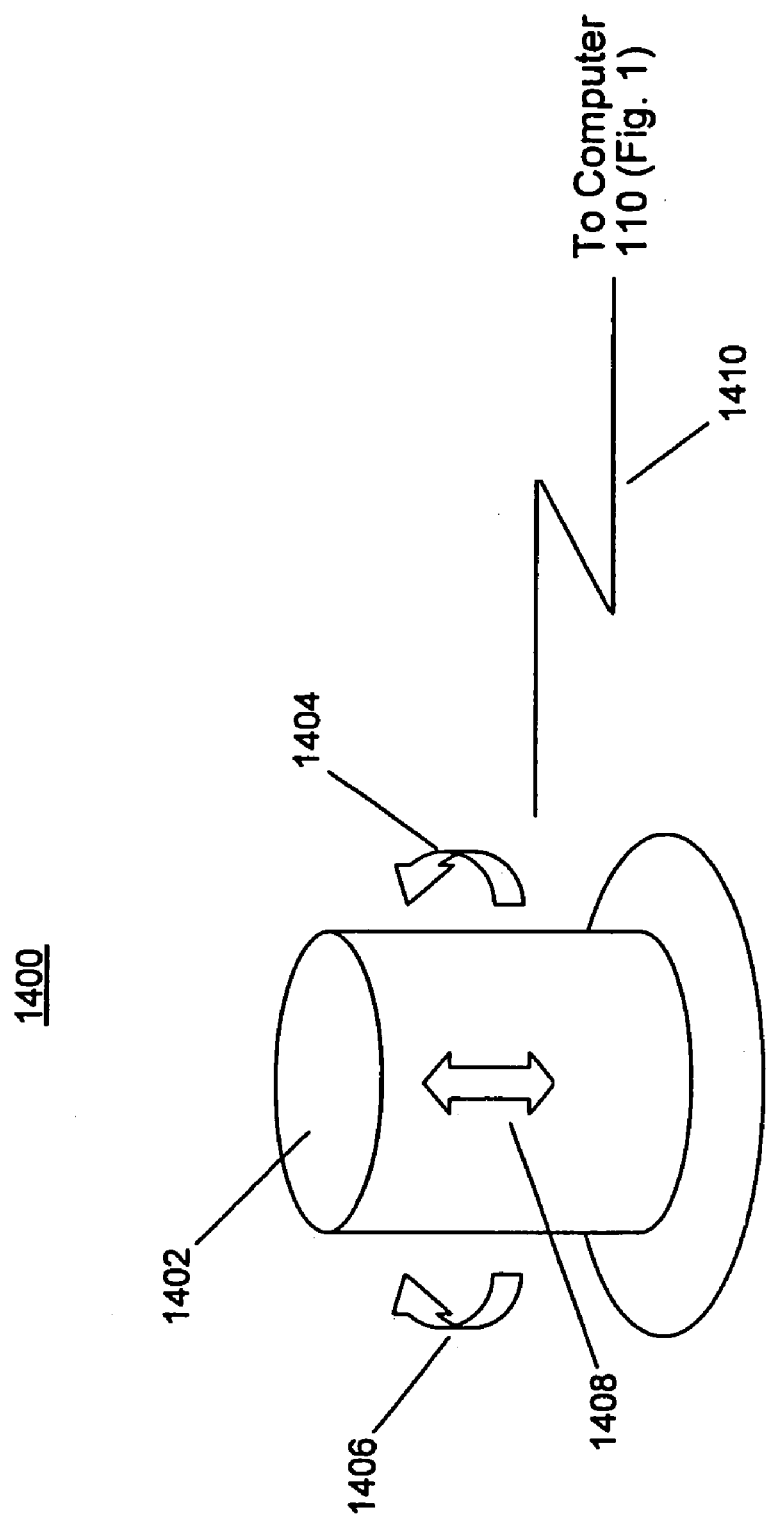
FIG. 14 illustrates a special cursor control for moving through and selecting icons.

FIG. 14 depicts an alternative method of moving through and selecting icons of either the grid interface of FIG. 12 or the carousel interface of FIG. 11, using a special cursor control 1400. In one embodiment, the special cursor control 1400 may include a rotating cylinder 1402 with a push down selector. Movement through the grid or the speed and direction of the carousel may be determined by the angular displacement of the cylinder 1402, as shown by arrows 1404 and 1406. Selection of the highlighted icon may be made by vertically depressing the cylinder 1402 as shown by arrow 1408. The cylinder 1402 may be attached to the computer 110 by wired or wireless mechanisms, such as a Universal Serial Bus (USB) connection or a Bluetooth wireless connection 1414.

The functional elements depicted, once selected, may present a traditional view of a the related matter, for example, selecting an open my documents icon may activate a folder view, such as "My Documents" found in operating systems available from Microsoft, under the brand name "Microsoft Windows™." Alternatively, subsequent functional selections may be made available, such as "create a document," "search for an existing document," "get a document from email," etc.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of presenting a function-oriented user interface on a display of a computer comprising:

presenting a plurality of icons arranged in an elliptical pattern, each of the plurality of icons representing a functional capability, including at least one of a first icon representing an entertainment function, a second icon representing a document editing function, and a third icon representing an Internet and communication function;

setting a cursor associated with a pointing device outside a boundary formed by the elliptical pattern of icons;

determining that the cursor is outside the boundary formed by the elliptical pattern of icons;

when the cursor is outside the boundary formed by the elliptical pattern of icons, determining a distance and direction of the cursor relative to the centerline of the elliptical pattern of icons;

rotating the elliptical pattern of icons at a constant speed proportional to the distance of the cursor from the centerline and in a direction matching the direction of the cursor relative to the centerline;

moving the cursor inside the boundary formed by the elliptical pattern;

determining the cursor is inside the boundary formed by the elliptical pattern;

stopping the rotating of the elliptical pattern after determining the cursor is inside the boundary formed by the elliptical pattern;

highlighting a front-most icon as a result of stopping the rotating of the elliptical pattern;

accepting a user signal indicating a selection of the highlighted front-most icon; and activating a default application corresponding to the functional capability associated with the highlighted front-most icon.

2. The method of claim 1, wherein rotating each of the plurality of icons to a front of the elliptical pattern comprises accepting a value corresponding to an angular position of a rotatable cylinder of a cursor control device and maintaining the rotating motion of the plurality of icons at a constant speed and direction proportional to the angular displacement of the rotatable cylinder.

3. The method of claim 1, further comprising:
presenting an object representing data; and
moving one of the plurality of icons onto the object for performing on the object the functional capability associated with the icon.

4. A method of presenting a function-oriented user interface on a display of a computer comprising:

presenting a plurality of icons in an elliptical pattern, including at least one of a first icon representing an entertainment function, a second icon representing a document editing function, and a third icon representing an Internet and communication function;

rotating each of the plurality of icons to a front of the elliptical pattern at a constant speed proportional to a distance of a cursor from a centerline through the elliptical pattern and in a direction matching the direction of the cursor relative to the centerline;

accepting a user signal indicating a selection of one of the plurality of icons;

activating a default application corresponding to the functional capability associated with the selected one of the plurality of icons;

presenting the plurality of icons arranged in an elliptical pattern;

selecting one of the plurality of icons from the elliptical pattern and moving it to a standalone position on the display, whereby the remaining plurality of icons re-form the elliptical pattern; and wherein rotating each of the plurality of icons to a front of the elliptical pattern comprises:

increasing the size of icons near the front of the elliptical pattern and decreasing the size of icons at the back of the elliptical pattern; and stopping the rotating of the elliptical pattern when the cursor is inside a boundary formed by the elliptical pattern.

5. The method of claim 4, wherein presenting the plurality of icons comprises presenting the plurality of icons as the only visible elements on the display of the computer.

* * * * *